United States Patent
Yang

(10) Patent No.: US 9,571,835 B2
(45) Date of Patent: Feb. 14, 2017

(54) METHOD AND APPARATUS FOR PROCESSING A SIGNAL

(71) Applicant: LG Electronics Inc., Seoul (KR)

(72) Inventor: Jeong Hyu Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 834 days.

(21) Appl. No.: 13/887,984

(22) Filed: May 6, 2013

(65) Prior Publication Data

US 2013/0322536 A1    Dec. 5, 2013

Related U.S. Application Data

(62) Division of application No. 12/309,225, filed as application No. PCT/KR2007/003390 on Jul. 12, 2007, now abandoned.

(Continued)

(51) Int. Cl.

| | |
|---|---|
| H04N 19/46 | (2014.01) |
| H04N 19/597 | (2014.01) |
| H04N 19/176 | (2014.01) |
| H04N 19/51 | (2014.01) |
| H04N 19/513 | (2014.01) |
| H04N 19/61 | (2014.01) |
| H04N 19/593 | (2014.01) |
| H04N 19/103 | (2014.01) |

(52) U.S. Cl.
CPC ...... *H04N 19/00769* (2013.01); *H04N 19/103* (2014.11); *H04N 19/176* (2014.11); *H04N 19/46* (2014.11); *H04N 19/51* (2014.11); *H04N 19/513* (2014.11); *H04N 19/593* (2014.11); *H04N 19/597* (2014.11); *H04N 19/61* (2014.11)

(58) Field of Classification Search
None
See application file for complete search history.

(56) References Cited

U.S. PATENT DOCUMENTS

| | | |
|---|---|---|
| 6,055,012 A | 4/2000 | Haskell et al. |
| 6,438,169 B1 | 8/2002 | Takashima et al. |

(Continued)

FOREIGN PATENT DOCUMENTS

| | | |
|---|---|---|
| CN | 1242907 A | 1/2000 |
| CN | 1482802 A | 3/2004 |

(Continued)

OTHER PUBLICATIONS

U.S. Office Action dated Jul. 17, 2013 for related U.S. Appl. No. 13/752,055.

(Continued)

*Primary Examiner* — Eileen Adams
(74) *Attorney, Agent, or Firm* — Dentons US LLP

(57) ABSTRACT

Example embodiments are directed toward a method of decoding a multi-view video signal using a video decoding apparatus including using a global motion vector of a non-anchor current picture in a current view to determine a corresponding block. A reference block in the current view is then determined using motion information of the current block that is generated from motion information of the corresponding block. A pixel value of the current block is predicted using the reference block in order to raise efficiency in signal processing of the multi-view video signal.

3 Claims, 11 Drawing Sheets

Related U.S. Application Data

(60) Provisional application No. 60/830,087, filed on Jul. 12, 2006, provisional application No. 60/847,930, filed on Sep. 29, 2006, provisional application No. 60/853,769, filed on Oct. 24, 2006, provisional application No. 60/854,702, filed on Oct. 27, 2006, provisional application No. 60/886,350, filed on Jan. 24, 2007, provisional application No. 60/909,582, filed on Apr. 2, 2007, provisional application No. 60/907,964, filed on Apr. 25, 2007.

(56) References Cited

U.S. PATENT DOCUMENTS

| | | |
|---|---|---|
| 7,286,689 B2 | 10/2007 | Damera-Venkata et al. |
| 7,444,664 B2 | 10/2008 | Lou et al. |
| 7,613,344 B2 | 11/2009 | Kim et al. |
| 7,671,893 B2 | 3/2010 | Li et al. |
| 7,710,462 B2 | 5/2010 | Xin et al. |
| 7,728,878 B2 | 6/2010 | Yea et al. |
| 7,782,943 B2 | 8/2010 | Jeon et al. |
| 7,782,944 B2 | 8/2010 | Jeon et al. |
| 7,782,945 B2 | 8/2010 | Jeon et al. |
| 7,782,946 B2 | 8/2010 | Jeon et al. |
| 7,782,947 B2 | 8/2010 | Jeon et al. |
| 7,782,948 B2 | 8/2010 | Jeon et al. |
| 7,782,949 B2 | 8/2010 | Jeon et al. |
| 7,782,950 B2 | 8/2010 | Jeon et al. |
| 7,817,865 B2 | 10/2010 | Yang |
| 7,817,866 B2 | 10/2010 | Yang |
| 7,831,102 B2 | 11/2010 | Yang |
| 7,856,148 B2 | 12/2010 | Yang |
| 2003/0202592 A1 | 10/2003 | Sohn et al. |
| 2004/0190615 A1* | 9/2004 | Abe ............... H04N 19/56 375/240.15 |
| 2004/0247159 A1 | 12/2004 | Damera-Venkata et al. |
| 2006/0029137 A1* | 2/2006 | Lee ............... H04N 5/145 375/240.12 |
| 2006/0132610 A1 | 6/2006 | Xin et al. |
| 2006/0133493 A1 | 6/2006 | Cho et al. |
| 2006/0133501 A1 | 6/2006 | Lee et al. |
| 2006/0146141 A1 | 7/2006 | Xin et al. |
| 2006/0146143 A1 | 7/2006 | Xin et al. |
| 2007/0064800 A1 | 3/2007 | Ha |
| 2007/0071107 A1 | 3/2007 | Ha |
| 2009/0168874 A1 | 7/2009 | Su et al. |
| 2009/0257669 A1 | 10/2009 | Kim et al. |
| 2010/0118942 A1 | 5/2010 | Pandit et al. |
| 2010/0135388 A1 | 6/2010 | Pandit et al. |
| 2010/0165077 A1 | 7/2010 | Yin et al. |
| 2010/0215100 A1 | 8/2010 | Jeon et al. |

FOREIGN PATENT DOCUMENTS

| | | |
|---|---|---|
| CN | 1545808 | 11/2004 |
| EP | 1418762 A1 | 5/2004 |
| EP | 1 515 550 A1 | 3/2005 |
| JP | 06-098312 | 4/1994 |
| JP | 2003517743 A | 5/2003 |
| JP | 2005-510187 | 4/2005 |
| JP | 2007-159113 | 6/2007 |
| KR | 2002-0032954 A | 5/2002 |
| KR | 10-0375708 | 2/2003 |
| KR | 10-2004-0013540 | 2/2004 |
| KR | 10-2005-0122717 | 12/2005 |
| KR | 10-0679740 | 1/2007 |
| WO | WO 2005/018217 A2 | 2/2005 |
| WO | WO-2005069630 A1 | 7/2005 |
| WO | WO 2006/001653 | 1/2006 |
| WO | WO 2006/014057 | 2/2006 |
| WO | WO 2006/062377 | 6/2006 |

OTHER PUBLICATIONS

International Search Report issued Nov. 5, 2007 in International Patent Application No. PCT/KR2007/003390.
J. Lopez et al., "Block-based Illumination Compensation and Search Techniques for Multiview Video Coding".
P. Kauff et al., "Data Format and Coding for Free Viewpoint Video".
H. Kimata et al., "Free-viewpoint Video Communication Using Multi-view Video Coding", NTT Technical Review, vol. 2, No. 8, Aug. 2004, pp. 21-26.
A. Smolic et al., "3D Video and Free Viewpoint Video—Technologies, Applications and MPEG Standards", ICME 2006, pp. 2161-2164.
ISO/IEC JTC1/SC29/WG11, "Survey of Algorithms Used for Multi-view Video Coding (MVC)", Hong Kong, China, Jan. 2005.
W. Yang et al., "Scalable Multiview Video Coding Using Wavelet", IEEE 2005, pp. 6078-6081.
A. Smolic et al., "Development of MPEG Standards for 3D and Free Viewpoint Video", Mitsubishi Electric Research Laboratories, TR-2005-116, Oct. 2005.
P. Merkle et al., "Efficient Compression of Multi-View Video Exploiting Inter-View Dependencies Based on H.264/MPEG4-AVC", ICME 2006, pp. 1717-1720.
H. Kimata et al., "Hierarchical Reference Picture Selection Method for Temporal Scalability Beyond H.264", IEEE 2004, pp. 181-184.
A. Smolic et al., "Interactive 3-D Video Representation and Coding Technologies", Proceedings of the IEEE, vol. 93, No. 1, Jan. 2005, pp. 98-110.
S.H. Kim et al., "Fast Local Motion-Compensation Algorithm for Video Sequences with Brightness Variations", IEEE Transaction on Circuits and Systems for Video Technology, vol. 13, No. 4, Apr. 2003, pp. 289-299.
International Search Report issued Apr. 22, 2008 in International App. No. PCT/KR2008/000444.
International Search Report issued Apr. 17, 2007 in International App. No. PCT/KR2007/000226.
International Search Report issued Apr. 4, 2007 in International App. No. PCT/KR2007/000228.
International Search Report issued Apr. 4, 2007 in International App. No. PCT/KR2007/000225.
Korean Notice of Allowance dated Nov. 9, 2009.
Korean Notice of Allowance dated Feb. 4, 2010 (Appln. No. 10-2008-7019747).
Korean Notice of Allowance dated Feb. 4, 2010 (Appln. No. 10-2009-7017209).
European Search Report dated Feb. 2, 2010 for corresponding Application No. 07768721.8.
Takanori Senoh et al: "Disparity vector prediction CE plan for MVC/CE4" Joint Video Team of ISO/IEC MPEG & ITU-T VCEG (ISO/IEC JTC1/SC29/WG11 and ITU-T SG16 Q6), No. M13166, Mar. 29, 2006, XP030041835.
"Description of Core Experiments in Multiview Video Coding" Joint Video Team of ISO/IEC MPEG & ITU-T VCEG (ISO/IEC JTC1/SC29/WG11 and ITU-T SG16 Q6), No. N8019, Apr. 7, 2006, XP030014511.
Lee S H et al: "Inter-view motion info copy methods in MVC" Joint Video Team of ISO/IEC MPEG & ITU-T VCEG (ISO/IEC JTC1/SC29/WG11 and ITU-T SG16 Q6), No. JVT-T135, Jul. 18, 2006, XP030006622.
Gang Zhu et al: "Inter-view Direct Mode in MVC" Joint Video Team of ISO/IEC MPEG & ITU-T VCEG (ISO/IEC JTC1/SC29/WG11 and ITU-T SG16 Q6), No. M13177, Mar. 30, 2006, XP030041846.
European Search Report dated May 18, 2010 for corresponding Application No. 07700955,3.
Jae Hoon Kim et al: "Dependent Bit Allocation in Multiview Video Coding" image processing, 2005. ICIP 2005. IEEE International Conference on Genova, Italy Sep. 11-14, 2005, Piscataway, NJ, USA, vol. 2, Sep. 11, 2005, pp. 293-296, XP010852663.
Shiping Li et al: "Approaches to H.264-Based Stereoscopic Video Coding" Image and Graphics, 2004, Proceedings. Third International Conference on Hong Kong, China Dec. 18-20, 2004, Piscataway, NJ, USA, IEEE, LNKD-DOI: 10.1109/ICIG.2004.39, Dec. 18, 2004 pp. 365-368, XP010779066.

(56) References Cited

OTHER PUBLICATIONS

Yung-Lyul Lee et al: "Multi-view Video Coding Using ILLUMINATION Change-Adaptive Motionin Estimation and 2-D Direct Mode" Jan. 1, 2005, Advances in Multimedia Information Processing—PCM 2005 Lecture Notes in Computer Science; LNCS, Springer, Berlin DE, pp. 396-407, XP019023978.

Ohm J-R: "Sereo/Mltiview Video Encoding Using The MPEG Faminly of Standards" Proceedings of the SPIE, US Lnkd-doi: 10.1117/12.349385, vol. 3639, Jan. 25, 1999, pp. 242-255, XP0008022007.

European Search Report (Appln. No. 07 700 952.0) dated May 18, 2010.

Lopes J. Et al.: "Block-based illumination compensation and search techniques for multiview video coding" Picture Coding Symposium 2004, San Francisco, CA, USA Dec. 15-17, 2004, pp. 509-514, XP00243841.

Yung-Lyul Lee et al: "Multi-view Video Coding Using ILLUMINATION Change-Adaptive Motionin Estimation and 2-D Direct Mode" Jan. 1, 2005, Advances in Multimedia Information Processing—PCM 2005 Lecture Notes in Computer Science; LNCS, Springer, Berlin, DE pp. 396-407, XP019023978.

Yung-Lyul Lee et al.: "Rsult of CE2 on Multi-view Video Coding" JVT of ISO/IEC MPEG&ITU-T VCEG(IDSO/IEC JTC1/SC29/WG11 and ITU-T SG16 Q6), No. M13143, Mar. 29, 2006, XP030041812.

Yung-Lyul Lee et al: "Result of CE2 on Multi-view Coding" 77. MPEG Meeting; Jul. 17 2006-Jul. 21, 2006; Klagenfurt; (Motion Picture Expert Group or iso/iec jtc1/sc29/wg11), No. M13498, Jul. 12, 2006, XP030042167.

Ohm J-R: "Stero/Multiview Video Encoding Using the MPEG Family of Standards" Proceedings of the SPIE, US LNKD-DOI: 10.1117/12.349385, Vo. 3639, Jan. 25, 1999, pp. 242-255, XP008022007.

"Advanced video coding for generic audiovisual servies; H.264 (05-03)" ITU-T Standard Superseded(s), International Telecommunication Union, Geneva, CH, No. H.264 (05/03), May 30, 2003, pp. 110-123, XP00258078.

U.S. Notice of Allowance dated Apr. 30, 2010 for U.S. Appl. No. 11/622,611.

USPTO Office Action dated Jun. 25, 2010 for U.S. Appl. No. 12/545,462.

European Search Report dated Sep. 3, 2010 issued in corresponding European application No. 07 768 721.8.

H.S. Koo, et al. "Motion Skip Mode for MVC" Joint Video Team (JVT) of ISO/IEC MPEG & ITU-T VCEG, Document: JVT-U091-L, pp. 1-7, (Oct. 2006).

H.S. Koo "Core experiment on Disparity and Motion Vector Coding(CE11)", Joint Video Team (JVT) of ISO/IEC MPEG & ITU-T VCEG, Document: JVT-U311, pp. 1-4, (Oct. 2006).

H.S. Koo, et al. "Macroblock Information Skip for MVC", Joint Video Team (JVT) of ISO/IEC MPEG & ITU-T VCEG, Document: JVT-V052r1, pp. 1-7, (Jan. 2007).

H.S. Koo "CE11: MVC Motion Skip Mode", Joint Video Team (JVT) of ISO/IEC MPEG & ITU-T VCEG, Document: JVT-V069, pp. 1-12, (Jan. 2007).

H.S. Koo "AHG Report: MVC motion/disparity vector coding", Joint Video Team (JVT) of ISO/IEC MPEG & ITU-T VCEG, Document: JVT-W012, pp. 1-4, (Apr. 2007).

H.S. Koo, et al. "MVC Motion Skip Mode", Joint Video Team (JVT) of ISO/IEC MPEG & ITU-T VCEG, Document: JVT-W081, pp. 1-13, (Apr. 2007).

Taiwan Office Action dated Nov. 4, 2010 issued in corresponding Taiwan Application No. 096125507 and English translation thereof.

Yongtae Kim, et al. "Fast Disparity and Motion Estimation for Multi-view Video Coding" IEEE Transactions on Consumer Electronics, vol. 53, No. 2, pp. 712-719, (May 2007).

European Office Action dated Jan. 20, 2011 issued in corresponding European Application No. 07768721.8.

Hangzhou, "wftp3.itu.int-/av-arch/jvt-site", Internet Citation, pp. 1-3, XP007916683.

U.S. Office Action dated May 25, 2011 issued in U.S. Appl. No. 11/622,675.

U.S. Office Action dated Jun. 20, 2011 issued in U.S. Appl. No. 11/622,681.

U.S. Office Action dated Jul. 11, 2011 issued in U.S. Appl. No. 11/622,709.

Chinese Patent Gazette dated Sep. 7, 2011 issued in corresponding Chinese Application No. 200780003120.5.

U.S. Notice of Allowance dated Dec. 5, 2011 issued in U.S. Appl. No. 11/622,709.

U.S. Office Action dated Oct. 13, 2011 issued in U.S. Appl. No. 11/622,675.

Chinese Notice of Allowance dated Mar. 5, 2013 for corresponding Chinese Application No. 200780003083.8 (translation provided).

\* cited by examiner

FIG. 7

| forward co-located macro-block's partition mode | backward co-located macro-block's partition mode | motion copy method's partition mode |
|---|---|---|
| Direct mode | Direct mode | Direct mode |
| Direct mode | 16x16 | 16x16 |
| Direct mode | 16x8 | 16x8 |
| Direct mode | 8x16 | 8x16 |
| Direct mode | 8x8 | 8x8 |
| 16x16 | Direct mode | 16x16 |
| 16x16 | 16x16 | 16x16 |
| 16x16 | 16x8 | 16x8 |
| 16x16 | 8x16 | 8x16 |
| 16x16 | 8x8 | 8x8 |
| 16x8 | Direct mode | 16x8 |
| 16x8 | 16x16 | 16x8 |
| 16x8 | 16x8 | 16x8 |
| 16x8 | 8x16 | 8x8 |
| 16x8 | 8x8 | 8x8 |
| 8x16 | Direct mode | 8x16 |
| 8x16 | 16x16 | 8x16 |
| 8x16 | 16x8 | 8x8 |
| 8x16 | 8x16 | 8x16 |
| 8x16 | 8x8 | 8x8 |
| 8x8 | Direct mode | 8x8 |
| 8x8 | 16x16 | 8x8 |
| 8x8 | 16x8 | 8x8 |
| 8x8 | 8x16 | 8x8 |
| 8x8 | 8x8 | 8x8 |

FIG. 8

| forward co-located macro-block's prediction direction | backward co-located macro-block's prediction direction | motion-copy method's prediction direction |
|---|---|---|
| forward | forward | forward |
| forward | backward | bi-directional |
| forward | bi-directional | bi-directional |
| backward | forward | bi-directional |
| backward | backward | backward |
| backward | bi-directional | bi-directional |
| bi-directional | forward | bi-directional |
| bi-directional | backward | bi-directional |
| bi-directional | bi-directional | bi-directional |

METHOD AND APPARATUS FOR PROCESSING A SIGNAL

CROSS-REFERENCE TO RELATED APPLICATIONS

This application is a divisional of U.S. application Ser. No. 12/309,225 filed on Jan. 12, 2009, which is a National Stage of International Application No. PCT/KR2007/003390 filed on Jul. 12, 2007, which claims priority under 35 U.S.C. §119(e), 120 and 365(c) to, U.S. Provisional Application No. 60/830,087 filed Jul. 12, 2006, U.S. Provisional Application No. 60/847,930 filed Sep. 29, 2006, U.S. Provisional Application No. 60/853,769 filed Oct. 24, 2006, U.S. Provisional Application No. 60/854,702 filed Oct. 27, 2006, U.S. Provisional Application No. 60/866,350 filed Jan. 24, 2007, U.S. Provisional Application No. 60/909,582 filed Apr. 2, 2007 and U.S. Provisional Application No. 60/907,964 filed Apr. 25, 2007, the contents of each of which is incorporated by reference in its entirety.

TECHNICAL FIELD

The present invention relates to a signal processing method and apparatus.

BACKGROUND ART

Compression coding means a series of signal processing techniques for transmitting digitalized information via a communication circuit or storing the digitalized information in a form suitable for a storage medium. As targets of compression coding, there are audio, video, characters, etc. In particular, a technique for performing compression coding on video is called video sequence compression. A video sequence is generally characterized in having spatial redundancy or temporal redundancy. Moreover, there is a multi-view video sequence belonging to one of fields for 3-dimensional (3D) video processing that provides multi-views to a user using at least one or more cameras.

DISCLOSURE OF THE INVENTION

Technical Problems

Since a multi-view video sequence has high correlation between views, it is able to remove overlapped information via spatial prediction between a plurality of views. So, various compression techniques are needed to efficiently perform prediction between a plurality of views.

If the spatial redundancy and the temporal redundancy are not sufficiently removed, a compression rate in coding signals is lowered. If the spatial redundancy and the temporal redundancy are excessively removed, it is unable to generate information necessary to perform coding signals. So, a reconstructing rate is degraded.

Moreover, in a multi-view video signal, since inter-view pictures mostly differ from each other in camera positions only, correlation and redundancy of the inter-view pictures are very high. If the redundancy of the inter-view pictures is not sufficiently removed or excessively removed, a compression rate or a reconstructing rate, however, is lowered.

Technical Solution

An object of the present invention is to raise efficiency in signal processing.

Another object of the present invention is to provide a method of predicting coding information of a signal, by which the signal can be efficiently processed.

A further object of the present invention is to provide a method of predicting motion information, by which a video signal can be efficiently coded.

Advantageous Effects

In processing a signal, when a temporal-direction Motion vector is given to a current unit, the present invention is able to predict a view-direction motion vector of the current unit using the temporal-direction motion vector. Since the temporal-direction motion vector refers to an image on a different time zone at the same view, it is able to almost predict the temporal-direction motion vector precisely unless dept of each object varies according to elapse of time. More precise prediction is enabled by predicting coding information for a current unit using coding information for other units neighbor to the current unit, by which a corresponding error transmission amount is reduced. So, it is able to perform efficient coding. And, it is also able to perform efficient coding by predicting the coding information for the current unit using coding information for a view direction of a reference unit associated with temporal directions of the neighbor units.

Moreover, even if motion information for a current unit is not transmitted, it is able to calculate motion information very similar to the motion information for the current unit. So, a reconstructing rate can be enhanced.

DESCRIPTION OF DRAWINGS

FIG. 7 is a table for various examples to select either a forward reference block or a backward reference block to predict partition information for a current block if both of the forward and backward reference blocks in a temporal direction refer to a block in a view direction according to one embodiment of the present invention;

FIG. 8 is a table for various examples to select either a forward reference block or a backward reference block to predict prediction direction information for a current block if both of the forward and backward reference blocks in a temporal direction refer to a block in a view direction according to one embodiment of the present invention;

BEST MODE

To achieve these and other advantages and in accordance with the purpose of the present invention, as embodied and broadly described, a signal processing method includes searching a correlated unit having a highest correlation on a first domain for a current block, obtaining coding information for the correlated unit, and predicting coding information for a second domain of the current block using the obtained coding information.

To further achieve these and other advantages and in accordance with the purpose of the present invention, a signal processing method includes searching a correlated unit on a first domain using a block neighbor to a current block, obtaining coding information for the correlated unit, and predicting coding information for a second domain of the current block using the obtained coding information.

To further achieve these and other advantages and in accordance with the purpose of the present invention, a signal processing method includes extracting motion skip information for a current block, extracting motion information for a co-located block of the current block, obtaining motion information for a reference block existing on a domain different that of the extracted motion information, and deriving motion information for the current block based on the obtained motion information for the reference block.

To further achieve these and other advantages and in accordance with the purpose of the present invention, a signal processing unit includes obtaining motion information between a current unit and a neighbor unit on a first domain, obtaining a correlated block corresponding to a current block included in the current unit based on the obtained motion information, obtaining motion information of the correlated unit on a second domain, and deriving motion information corresponding to the second domain of the current unit using the obtained motion information for the second domain.

Mode for Invention

Reference will now be made in detail to the preferred embodiments of the present invention, examples of which are illustrated in the accompanying drawings. It is to be understood that both the foregoing general description and the following detailed description are exemplary and explanatory and are intended to provide further explanation of the invention as claimed.

Figure 1:
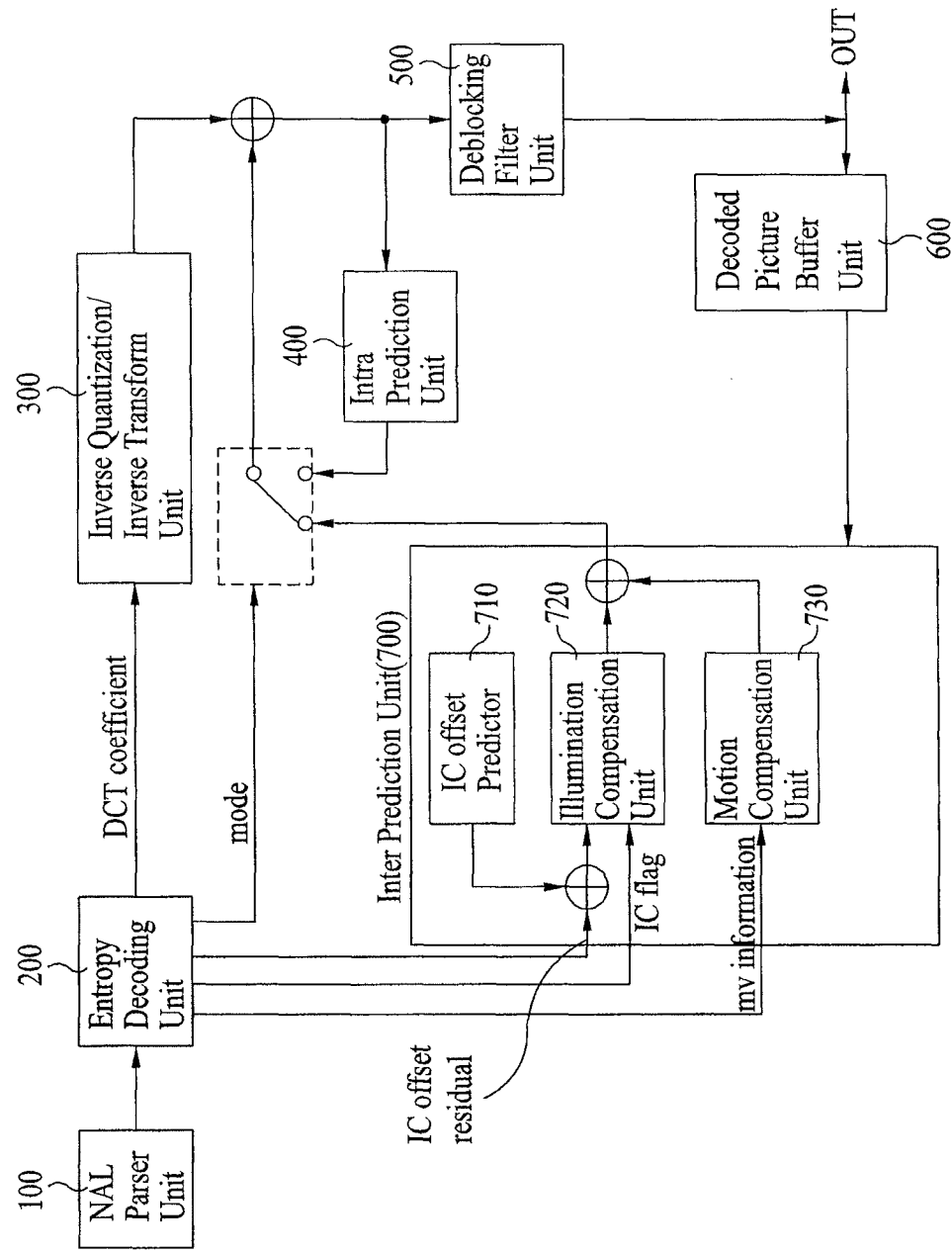
FIG. 1 is a schematic block diagram of a video signal decoder according to the present invention.

FIG. 1 is a schematic block diagram of a video signal decoder according to the present invention.

Referring to FIG. 1, the decoder mainly includes a parser unit 100, an entropy decoding unit 200, an inverse quantization/inverse transform unit 300, an intra-prediction unit 400, a deblocking filter unit 500, a decoded picture buffer unit 600, an inter-prediction unit 700, and the like. And, the inter-prediction unit 700 includes an IC offset prediction unit 710, an illumination compensation unit 720, a motion compensation unit 730, and the like.

The parser unit 100 performs parsing by NAL unit to decode a received video sequence. Generally, at least one or more sequence parameter sets and at least one or more picture parameter sets are transferred to a decoder before a slice header and slice data are decoded. In this case, various kinds of configuration information can be included in a NAL header area or an extended area of a NAL header. Since MVC is an additional technique for the conventional AVC technique, it would be more efficient to add various kinds of configuration informations just in case of an MVC stream rather than add them unconditionally. For instance, flag information for discriminating a presence or non-presence of the MVC stream can be added to the NAL header area or the extended area of the NAL header. Only if an inputted bit stream corresponds to a multi-view video coded bit stream according to the flag information, it is able to add configuration informations for the multi-view video. For instance, the configuration informations can include temporal level information, view level information, inter-view picture group identification information, view identification information, and the like.

The parsed stream is entropy-decoded by the entropy decoding unit 200. A coefficient of each macroblock, a motion vector and the like are then extracted. The inverse quantization/inverse transform unit 300 obtains a transformed coefficient generated from multiplying a received quantized value by a predetermined constant and then reconstructs a pixel value by inverse-transforming the coefficient. The intra-prediction unit 400 performs intra-screen prediction from a decoded sample within a current picture using the reconstructed pixel value. Meanwhile, the deblocking filter unit 500 applies the reconstructed pixel value to each coded macroblock to reduce block distortion. A filter improves an image quality of a decoded picture by smoothening an edge of block. Selection of a filtering process depends on a boundary strength and a gradient of an image sample around the boundary. Pictures having undergone the filtering are outputted or stored in the decoded picture buffer unit 600.

The decoded picture buffer unit 600 plays a role in storing or opening the previously coded pictures to perform inter-picture prediction. In this case, 'frame_num' and POC (picture order count) of each picture is used to store the corresponding picture in the decoded picture buffer unit 600 or open the corresponding picture. In MVC, since some of the previously coded pictures may differ from a current picture in view, it is able to use view information for identifying a view of picture together with the 'frame_num' and POC in order to utilize those pictures as reference pictures. And, the inter-prediction unit 700 can use the reference pictures managed in the above manner.

The inter-prediction unit 700 performs inter-picture prediction using the reference picture stored in the decoded picture buffer unit 600. An inter-coded macroblock can be divided into macroblock partitions. And, each of the macroblock partitions can be predicted from one or two reference pictures. The inter-prediction unit 700 includes the IC offset prediction unit 710, the illumination compensation unit 720, and the motion compensation unit 730.

In case that an inputted bit stream corresponds to a multi-view sequence, since a plurality of view sequences are obtained from different camera, respectively, there occurs an illumination difference due to internal and external factors of the cameras. To prevent the illumination difference, the illumination compensation unit 720 performs illumination compensation. In performing the illumination compensation, it is able to use flag information indicating whether to perform the illumination compensation on a predetermined layer of a video signal. For instance, it is able to perform the illumination compensation using flag information for indicating whether to perform the illumination compensation on a corresponding slice or a corresponding macroblock. In performing the illumination compensation using the flag information, it is applicable to various macroblock types (e.g., inter 16×16 mode, B-skip mode, direct mode, etc.).

The motion compensation unit 730 compensates motion of a current block using informations transmitted by the entropy decoding unit 200. The motion compensation unit 730 extracts motion vectors of blocks neighbor to a current block from a video signal and obtains a predicted motion vector value of the current block. The motion compensation unit 730 then compensates for a motion of the current block using the obtained predicted motion vector value and an offset vector extracted from the video signal. This motion compensation can be performed using a single reference picture or a plurality of pictures. In multi-view video coding, if a current picture refers to pictures at another view, it is able to perform the motion compensation using information for a reference picture list for inter-view prediction stored in the decoded picture buffer unit 600. And, it is also able to perform the motion compensation using view information for identifying a view of the corresponding picture.

A direct prediction mode (direct mode) is a coding mode for predicting motion information for a current block from motion information for a coded block. This method improves compression efficiency because the number of bits necessary to encode motion information can be saved. For instance, a temporal direct mode predicts motion information for a current block using motion information correlation in a temporal direction. The temporal direct mode is effective when a speed of a motion in a sequence that includes different motions. A spatial direct mode predicts motion information for a current block using motion information correlation in a spatial direction. The spatial direct mode is effective when a speed of a motion varies in a sequence including identical motions.

The inter-predicted pictures and the intra-predicted pictures through the above process are selected according to a prediction mode to reconstruct a current picture. Various embodiments for providing an efficient signal processing method are explained in the following description.

Figure 2:
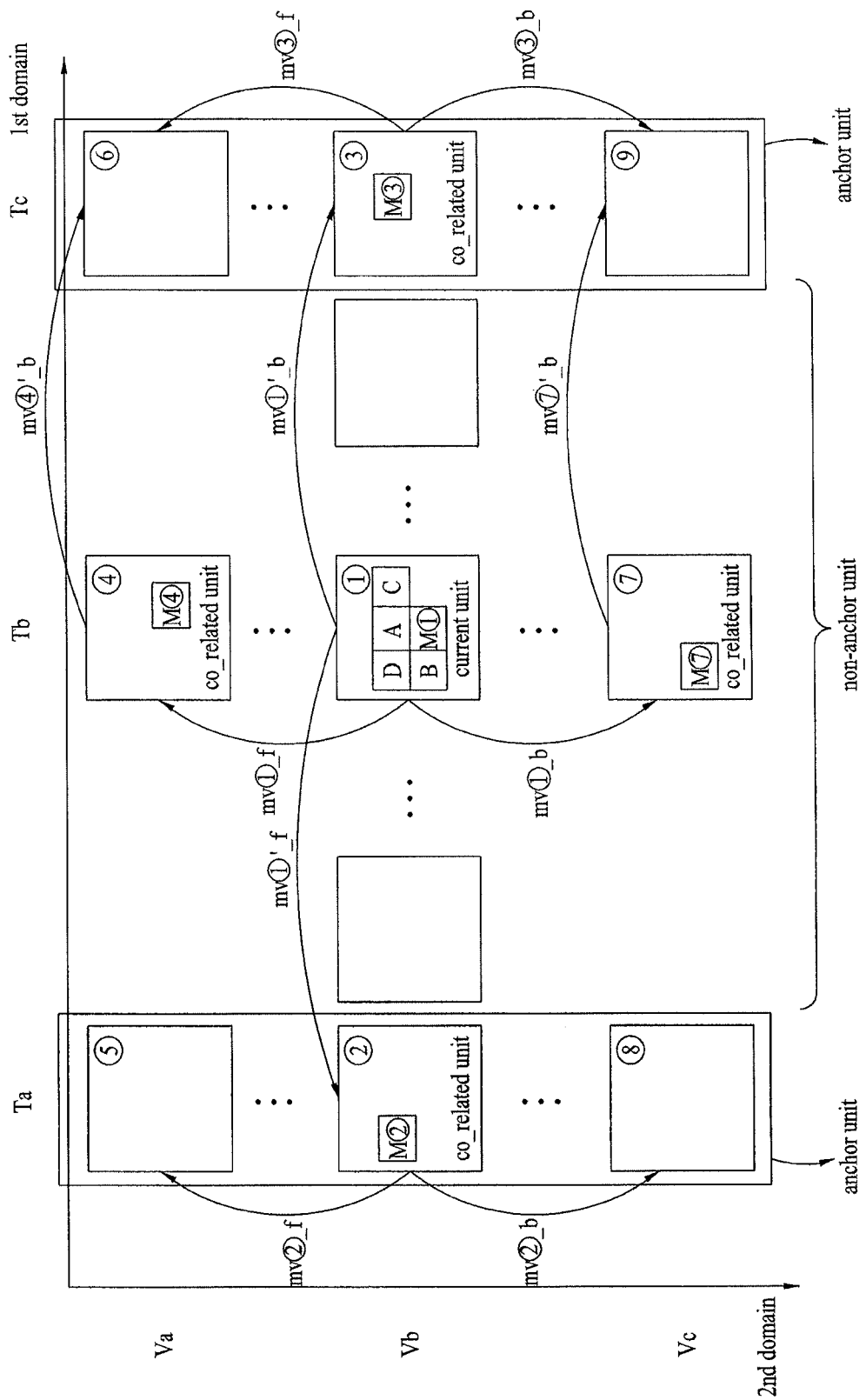
FIG. 2 is a diagram for a method of predicting coding information for a current unit according to one embodiment of the present invention.

FIG. 2 is a diagram for a method of predicting coding information for a current unit according to one embodiment of the present invention.

First of all, a unit used in the present invention can include the meanings of block, sub-block, macroblock, slice, picture, frame, picture group, sequence and the like in being applied to a video signal. So, the meaning of the unit should be construed as that of each application example. Moreover, in applying the unit to another signal as well as a video signal, the unit can be construed as a different meaning suitable for the corresponding signal.

In a multi-view video sequence, each unit can exist in a first or second domain. For instance, the first domain corresponds to a temporal domain and the second domain corresponds to a spatial domain. In this case, the respective units can exist on axes in a temporal direction or a spatial direction (for example, view direction, etc). So, some units can obtain prediction information in the temporal direction only or other units can obtain prediction information in the spatial direction only. Also, some units can obtain prediction information in both the temporal direction and the spatial direction. In case of predicting coding information in the temporal direction, if a reference unit exists on a different time zone at the same view, each of the units has a temporal-direction motion vector. And if a reference unit exists on a different view at the same time, each of the units has a spatial-direction motion vector. This vector may be called a disparity vector. In the following description, a motion vector includes a concept of the temporal-direction motion vector and a concept of the spatial-direction motion vector. In the present invention, coding information can include information for a motion vector, a reference index, a block type, a prediction direction, and the like.

According to one embodiment of the present invention, if a temporal-direction motion vector is given to a current unit ①, it is able to predict a view-direction motion vector of the current unit ① using the temporal-direction motion vector. For instance, it is able to find a unit M③ indicated by the temporal-direction motion vector from a unit ③ (e.g., reference unit) having highest correlation with the current unit ①. In this case, if the unit M③ has a view-direction motion vector mv ③_f, it is able to predict it as a view-direction motion vector of the current unit ①. Since the temporal-direction motion vector indicates to an image on a different time zone of the same view, it is able to almost accurately predict the view-direction motion vector unless depths of objects considerably vary according to lapse of time.

Likewise, if a view-direction motion vector is given to a current unit ①, it is able to predict a temporal-direction motion vector of the current unit ① using the view-direction motion vector. For instance, it is able to find a unit M④ indicated by the view-direction motion vector from a unit ④ (e.g., reference unit) having highest correlation with the current unit ①. In this case, if the unit M④ has a temporal-direction motion vector mv④'_b, it is able to predict it as a temporal-direction motion vector of the current unit ①. Since the view-direction motion vector indicates to an image on the same time zone of a different view, a temporal motion of a specific object will be almost similar for each camera. So, it is able to almost accurately predict the temporal-direction motion vector.

Moreover, in the above embodiment, in case that bi-directional prediction is carried out according to a block type of a current unit, it is apparent that each of the above-explained cases is applicable to both forward and backward directions.

In each of the above embodiments, a start position of the unit (correlated unit ③ or correlated unit ④) indicated by the motion vector may not coincide with a start position of a 4×4 block generated from equally dividing a macroblock, to which each unit belongs), by 4×4. If so, it is able to predict motion information in a manner of finding a closest 4×4 lock and then bringing motion information for the block or in a manner of averaging motion informations for blocks over-lapped with the correlated unit ③ or the correlated unit ④. Thus, using this method, it is able to predict motion information for each unit on the first or second domain.

According to another embodiment of the present invention, it is able to predict motion information for a current unit using information for units neighbor to the current unit.

For instance, it is assumed that two neighbor units A and B among a plurality of units neighbor to a current unit ① have temporal-direction motion vectors and that a unit C has a view-direction motion vector. In this case, if it is attempted to predict a temporal-direction motion vector of the current unit ①, the temporal-direction motion vectors of the neighbor units A and B are usable. If the method according to the former embodiment is used, it is able to predict a temporal-direction motion vector of the neighbor unit C using the view-direction motion vector of the neighbor unit C. And, it is able to predict a temporal-direction motion vector of the current unit ①  using the three temporal-direction motion vectors including the predicted temporal-direction motion vector of the neighbor unit C. Thus, the same method of applying the motion vector on the first domain is applicable to the second domain.

For instance, in case of attempting to predict a view-direction motion vector of a current unit ①, it is able to directly use a view-direction motion vector of a neighbor unit C. If the method of the former embodiment is used, it is able to predict each view-direction motion vector using temporal-direction motion vectors of the neighbor units A and B. And, it is able to more accurately predict a view-direction motion vector of the current unit ①.

Moreover, it is able to predict a temporal-direction motion vector and a view-direction motion vector of the current unit ① by applying the above method to all combinations that the neighbor units of the current unit ① have temporal-direction motion vectors and view-direction motion vectors.

In order for blocks of each unit used as a reference unit to have both temporal-direction motion vectors and view-direction motion vectors in applying the above-explained method, the following method is usable. It is assumed that a unit, which will have prediction information in a temporal direction only, is named a unit-T and that a unit, which will have prediction information in a view direction only, is named a unit-V. In this case, the unit-T needs to have a temporal-direction motion vector only and the unit-V needs to have a temporal-direction motion vector only. The unit-T or the unit-V may be intra-coded. If a current block is intra-coded in the unit-V, it is able to predict a view-direction motion vector of the current block using view-direction motion vectors of neighbor blocks.

Likewise, if a current block of the unit-T is intra-coded, it is able to predict a temporal-direction motion vector using a temporal-direction motion vector of a neighbor block. And, it is able to set a temporal-direction motion vector of the current block to the predicted temporal-direction motion vector. Assuming that a unit, which will have prediction information from both time and view directions, is named a unit-T/V, it will have a single time or view direction motion vector for each block only. Besides, it is able to set a motion vector of a current block to a motion vector predicted along a reference unit in the aforesaid manner. In case that intra-coding is performed on the unit-T/V, it is able to predict a motion vector of a current block using temporal direction motion vectors and view-direction motion vectors of neighbor blocks. Thus, for the unit to which intra-coding is applied, the method of performing prediction through neighbor units can be carried out in a manner of taking a median of three neighbor units or an average of nine neighbor 4×4 units.

According to another embodiment of the present invention, it is able to use an approximate unit in the vicinity of a portion indicated by a motion vector of a current unit as a correlated unit of a current unit. In this case, if is able to perform more accurate prediction using a position difference vector between the correlated unit and the approximate unit.

According to resolution of a motion vector, a position of an initial correlated unit is found by resolution of 1/n pixel (n=1, 2, 4, 8, etc.). In this case, it may not be correctly mapped to a unit in a normalized lattice structure. Namely, if n>1, pixels of the correlated unit may be located at a position of a decimal point pixel of a unit in a lattice structure. According to information obtained from a correlated unit, mapping can be carried out in a manner of approximating to a larger lattice structure by moving from a position of an initially mapped correlated unit. For instance, in case of attempting to predict a reference index, an 8×8 block position in a normalized lattice structure of a correlated unit can be matched. In this case, for four 8×8 blocks of a current block, reference index information for each 8×8 block of a corresponding macroblock is usable. And, motion information can be brought for each 4×4 block.

Since motion information is provided by 4×4 block unit, in case of attempting to obtain this information, it is able to match normalized 4×4 lattice block positions in correlated unit. In this case, it is able to obtain motion information from the corresponding 4×4 block. If mapping is carried out to 16×16 macroblock position in a normalized lattice structure of a correlated unit, all information for a corresponding macroblock can be brought. For instance, it is able to bring information for a block type, a reference index, a motion vector, and the like.

There are various embodiments in a method of approximation to a position in a neighbor normalized structure from the above-explained initial mapping position. In a normalized structure, a lattice structure such as a pixel scale, a 4×4 block scale, an 8×8 block scale, a 16×16 block scale and the like can be taken into consideration. For instance, there is a method of approximation to a left upper end pixel of a unit including an initial position point to which a left upper corner pixel of a current unit is mapped. In case of existence on a corner, approximation can be carried out to a left upper end pixel position of a unit at one side. In this case, it is able to select a unit at a left upper end, a right upper end, a left lower end or a right lower end. Alternatively, mapping can be carried out to a position point nearest to an initially mapped position. For instance, in case of attempting to perform mapping by 8×8 block scale, mapping to a nearest position point can be performed by measuring a distance from a left upper end pixel position of each 8×8 block.

According to another embodiment of the present invention, it is able to predict coding information for a second domain of a current unit using coding information for a second domain of a first domain unit. In this case, block information as coding information can be obtained together with motion information. And, a preset table is usable to derive coding information. For instance, a skip mode means that information for a different unit coded prior to a current unit is utilized as information for the current unit. In applying the skip mode, information existing on different domains are usable. Details of the corresponding embodiments are explained as follows.

For first example, it can be assumed that relative motion relations between objects (or backgrounds) within two different view sequences at time Tb are maintained almost similar at time Tc close enough. In this case, there exists a high degree of correlation between view direction coding information at the time Tb and view direction coding information at the time Tc. High coding efficiency can be obtained using motion information for a corresponding block on a different time zone at the same view intactly. And, it is able to use motion skip information indicating whether this scheme is used. If a motion skip mode is applied according to the motion skip information, it is able to predict such motion information as bock type, motion vector, reference index and the like from a corresponding block of a current block. So, it is able to reduce a bit amount required from coding the motion information. For instance, if motion_skip_flag is 0, the motion skip mode is not applied. If motion_skip_flag is 1, the motion skip mode is applied.

The motion skip information may be located at a macroblock layer. For instance, the motion skip information is located in an expanded area of a macroblock layer to inform whether motion information is brought from a bit stream in a decoder side.

For second example, like the above example, the same scheme is usable in a manner of switching first and second domains. In particular, it is highly probable that an object (or background) within a view Vb at a time Tb and an object (or background) within a view Va neighbor to the view Vb at the time Tb may have motion informations similar to each other. In this case, if motion information for a corresponding block at another view on the same time zone is brought to use intact, high coding efficiency is available. And, motion skip information indicating whether this scheme is used is usable.

For the above-explained two kinds of motion skip modes, a method of finding a correlated block to a current unit is similarly applicable. In the following description, for convenience, the first example is named an inter-view motion skip and the second example is named a temporal motion skip.

A method of finding a correlated unit to a current unit is explained as follows.

First of all, as the correlated unit, it is able to use a unit located at the same position as the position of the current unit among units existing on a domain different from that of the current unit. For instance, in case of inter-view motion skip mode, a block, located at a same position as the position of the current block, existing at a different view on a same time zone is usable as a correlated block. In case of temporal motion skip mode, a block, located at a same position as the position of the current block, existing at a same view on a different time zone is usable as a correlated block. Alternatively, it is able to find the correlated block using motion information for neighbor blocks to a current block. This has been explained in the foregoing description. Thus, once the correlated block is found, it is able to predict motion information for the current block using the motion information for each correlated block. If the correlated block dies not have motion information, the motion skip mode may not be applicable. The above-explained method of finding the correlated unit can be intactly extended as a method of finding a correlated unit for a smaller or larger unit.

Various methods of the embodiments are available by combining the aforesaid two kinds of skip mode schemes.

In a first embodiment, flags can be separately managed to identify which one of the two kinds of the skip modes is used. For instance, an inter-view skip mode can be represented as inter_view_motion_skip_flag and a temporal skip mode can be represented as temporal_motion_skip_flag. It is able to represent a presence or non-presence of application using two flag bits on syntax. This is to select a better one after both of the two kinds of the skip modes have been applied. Alternatively, one of the two kinds of the skip modes is usable per slice only.

For instance, in case of an inter-view motion skip mode, neighbor units to a current unit should refer to a unit existing on a different time zone at a same view. If any one of the neighbor units fails to meet this condition, the inter-view motion skip mode may not be applicable. Alternatively, after a reference unit in a view direction has been found from motion information for neighbor units, if the reference unit has motion information in a temporal direction, the motion information in the temporal direction is usable. And, the temporal motion skip mode is applicable in a similar manner. Namely, neighbor units to a current unit should refer to a unit existing at a different view on a same time zone. If any one of the neighbor units fails to meet this condition, the temporal motion skip mode may not be applicable. Alternatively, after a reference unit in a temporal direction has been found from motion information for neighbor units, if the reference unit has motion information in a view direction, the motion information in the view direction is usable.

For another instance, in case of deciding one motion skip mode by slice unit and then using the decided motion skip mode, it is able to insert information, which indicates how a motion skip mode will be applied, in a slice header. For example, a syntax element 'motion_skip_enable' is usable. If 'motion_skip_enable' is 1, an inter-view motion skip mode is applied. If 'motion_skip_enable' is 0, a temporal motion skip mode is applied. And, it is able to represent whether a motion skip mode is applied to a corresponding macroblock though 'motion_skip_flag' for each macroblock. A position of this flag may correspond to an extended area of a macroblock layer.

In a second embodiment, if a reference unit predicted from neighbor units to a current unit exists on a view axis, a temporal motion skip mode is applied. If the predicted reference unit exists on a temporal axis, an inter-view motion skip mode is applicable. This can be known to a decoder side. So, one 'motion_skip_flag' is enough. In this case, a mode can be decided according to a method of predicting motion information from neighbor units. For instance, after a decoder side has parsed motion_skip_flag, if a motion skip mode is applied, it is able to predict motion information from neighbor units. If the predicted reference unit is a unit at a different view on a same time zone, it is able to apply a temporal motion skip mode. If the predicted reference unit is a unit existing at a same view on a different time zone, it is able to apply an inter-view motion skip mode. By the same method in a spatial direct prediction mode as a method of obtaining motion information to find a correlated unit from neighbor units, it is able to derive a reference index and a motion vector.

In a third embodiment, it is able to use one of the two kinds of motion skip modes only. In this case, one 'motion_skip_flag' is necessary only. For instance, in applying an inter-view skip mode, neighbor units to a current unit should refer to a unit at a same view on a different time zone. If any of the neighbor units fails to meet this condition, the inter-view motion skip mode may not be applicable. After a reference unit in a view direction has been found from motion information for neighbor units, if the reference unit has motion information in a temporal direction, it is able to use the motion information in the temporal direction. This scheme can be similarly applied to the case of applying the temporal motion skip mode.

In case of an inter-view motion skip mode, if motion information for a correlated unit is not the motion information for a view direction, the algorithm may not be applied. And, it is also able to derive a motion vector using a proportional formula according to a time difference between a current unit and a correlated unit or a time difference between a correlated unit and a reference unit of the correlated unit. Likewise, in case of a temporal motion skip mode, if motion information for a correlated block is not the motion information in a temporal direction, the above algorithm may not be applied. Alternatively, it is able to derive a motion vector using a proportional formula according an inter-view geometrical or topological distance between a current unit and a correlated unit or between a correlated unit and a reference unit of the correlated unit. For instance, let's assume that real cameras are located on a straight line in order of V0, V1 and V2. It is assumed that a current unit is located at V1. It is assumed that a correlated unit is located at V0. And, it is assumed that a reference unit of the correlated unit is located at V2. In this case, a size of each component of a motion vector of the correlated block is set to ½ to use. If a distance between real cameras is given, it is able to derive a motion vector by considering an actual distance. Moreover, even if cameras are not located on a straight line, a geometrical or topological distance is usable.

A discrimination between views can be known through view identification information. And, a unit discrimination on a temporal axis can be known through POC (picture order count), frame number or the like. In a multi-view video sequence, it is unable to find a correct unit between different views using a reference index only. If a rearrangement process of reference units takes place differently between views, a unit indicated by a reference index at one view and a unit indicated by a reference index having an identical value at a different view may not be correspondent to each other. For instance, if a unit indicated by a reference index of a macroblock M① existing at Vb and Tb corresponds to a unit ③ exiting at Vb and Tc, an identical reference index at a view Va may correspond to a unit ⑤ existing at Va and Ta. So, in brining motion information for a correlated unit, at least one of picture order count (POC), frame number, and/or view identification information may be needed instead of a reference index. It is able to finally find an identical reference by comparing at least one of picture order counts (POC), frame numbers and/or view identification informations of reference units on a reference list of a current unit.

Moreover, the motion vector derived in the above manner is used as a predicted value and an actual motion vector is found. So, the corresponding difference is coded to use. In this case, it is able to refer to a more accurate position.

Figure 3:
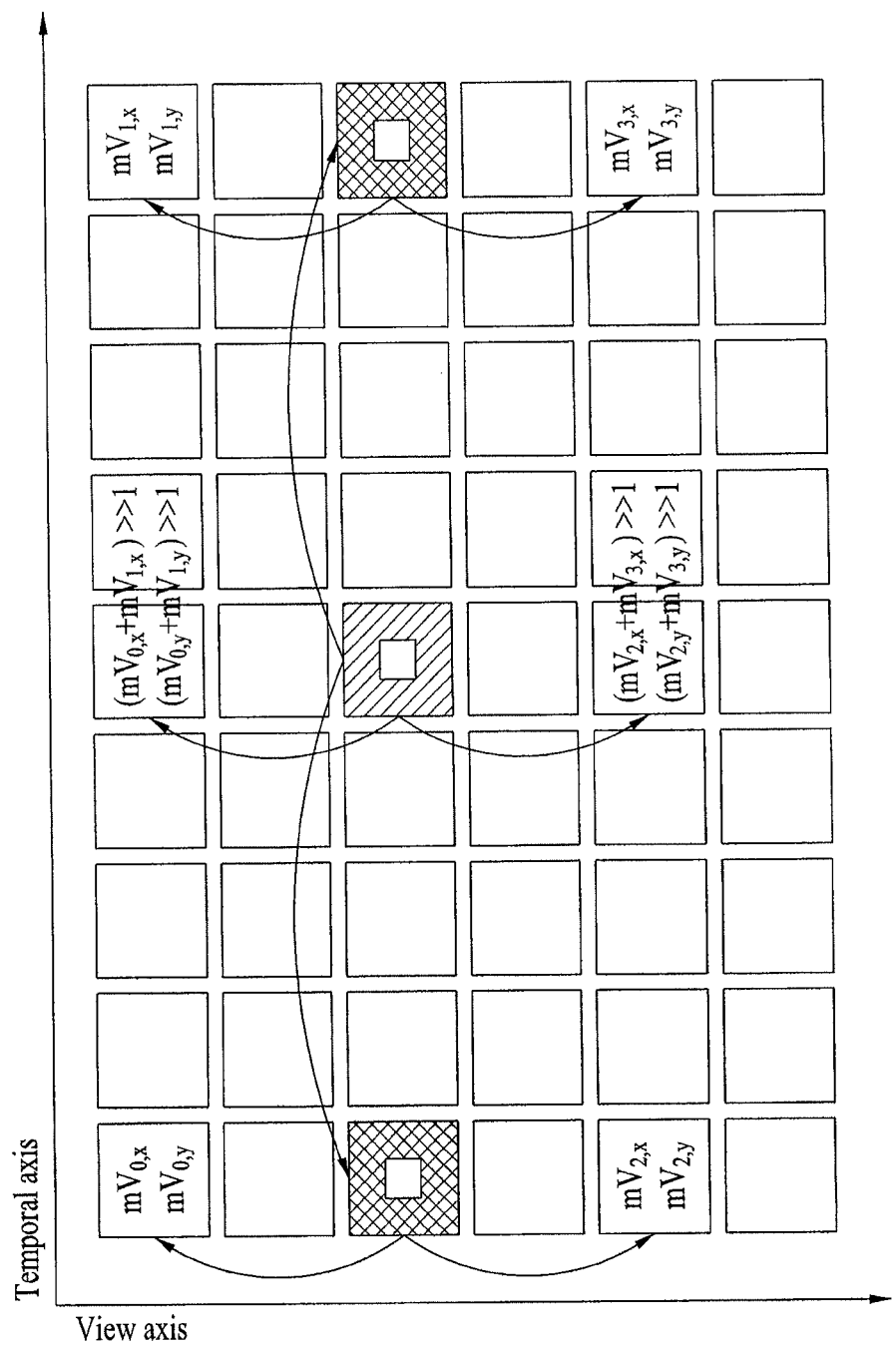
FIG. 3 is a diagram for a method of predicting a motion vector according to one embodiment of the present invention.

FIG. 3 is a diagram for a method of predicting a motion vector according to one embodiment of the present invention.

An encoder predicts motion information for a current block using motion information for a block neighbor to the current block and then transfers a difference between an actual motion vector and a predicted motion vector. Likewise, a decoder determines whether a reference picture number of a picture referred to by a current macroblock is identical to a reference picture number of a picture referred to by a neighbor block and then acquires a predicted motion vector value. For instance, if there exists one block having the same reference picture number of the current macroblock among the neighbor blocks, a motion vector of the neighbor block is used as it is. IN other cases, a median value of motion vectors of the neighbor blocks is used.

In multi-view video coding, a reference picture can exist on a view axis as well as on a temporal axis. Due to this characteristic, if a reference picture number of a current macroblock differs from that of a neighbor block, it is highly probable that corresponding motion vectors may not have correlations with each other. If so, accuracy of a predicted motion vector value is considerably lowered. So, a new motion vector predicting method using inter-view correlation according to one embodiment of the present invention is proposed.

For instance, a motion vector generated between views may be dependent on depth of each object. If depth of sequence has not considerable spatial variation and if a motion of the sequence according to a variation on a temporal axis is not severe, depth at a position of each macroblock will not considerably vary. In this case, depth may mean information capable of indicating an inter-view disparity. Moreover, since influences of global motion vectors basically exits between cameras, if a global vector is sufficiently larger than a depth variation despite that a depth slightly varies, using the global motion vector may be more efficient than using a temporal direction motion vector.

In this case, a global motion vector may means a motion vector applicable to a predetermined area in common. For instance, if a motion vector corresponds to a partial area (e.g., macroblock, block, pixel, etc.), a global motion vector (or global disparity vector) is the motion vector corresponding to a whole area including the partial area. For instance, the whole area may correspond to a single slice, a single picture or a whole sequence. And, the whole area may correspond to at least one object within a picture, a background or a predetermined area. The global motion vector may be a value by a pixel unit, a ¼ pixel unit, a 4×4 unit, an 8×8 unit or a macroblock unit.

According to one embodiment of the present invention, it is able to predict a motion vector of a current block using inter-view motion information of co-located block. In this case, the co-located block may mean a block neighbor to a current block existing in a same picture, or a block, located at a same position as the position of the current block, included in a different picture. For instance, the co-located block may be a spatial co-located block in case of a different picture at a different view or a temporal co-located block in case of a different picture at a same view.

In multi-view video coding structure, random access can be realized in a manner of providing pictures to be predicted in a view direction with a predetermined temporal interval only. Thus, if two pictures for predicting motion information in a view direction only are decoded, it is able to apply a new motion vector predicting method to pictures temporally existing between the two pictures. For instance, it is able to obtain a view-direction motion vector from a picture for view-direction prediction only. And, the obtained vector can be stored by a 4×4 block unit. If an illumination difference is considerable in case of performing view-direction prediction only, intra-prediction coding frequently takes place. In this case, a motion vector can be set to 0. Yet, if coding by intra-prediction is frequently performed due to the considerable illumination difference, many macroblocks having unknown information for a view-direction motion vector are generated. To compensate this, in case of intra-prediction, it is able to calculate a virtual inter-view motion vector using a motion vector of a neighbor block. And, a motion vector of a block coded by the intra-prediction can be set to the virtual inter-view motion vector.

After inter-view motion information has been obtained from the two decoded pictures, it is able to code hierarchical pictures-B existing between the two pictures. In this case, the two decoded pictures may be anchor pictures. In this case, the anchor picture means an encoded picture that refers to slices in a frame on a same time zone only. For instance, the anchor pictures means the encoded picture that refers to the slice at a different view but does not refer to a slice at a current view.

If neighbor blocks do not have inter-view motion vectors, it is able to predict an inter-view motion vector of each partition using an average of inter-view motion vectors of a co-located 4×4 block in the decoded picture. And, the same manner can be applied to the case that a neighbor block has both an inter-view motion vector and a temporal motion vector. For instance, a motion vector of a current block can be predicted using Formula 1 and Formula 2.

$$\frac{\sum_{i=0}^{M}\sum_{j=0}^{N}(mv_{0,x}[i][j]+mv_{1,x}[i][j])+MN}{2MN} \quad \text{[Formula 1]}$$

$$\frac{\sum_{i=0}^{M}\sum_{j=0}^{N}(mv_{0,y}[i][j]+mv_{1,y}[i][j])+MN}{2MN} \quad \text{[Formula 2]}$$

In this case, 'M' indicates a horizontal block size of each partition and 'N' indicates a vertical block size of each partition. And, '$mv_0$' and '$mv_1$' indicate motion vectors of forward and backward reference pictures among the decoded pictures, respectively. For instance, each of '$mv_0$' and '$mv_1$' may indicate an inter-view motion vector of an anchor picture or a global motion vector of an anchor picture.

Although neighbor blocks have inter-view reference pictures, respectively, it is able to obtain a new predicted motion vector value from a median or average of the predicted inter-view motion vectors.

In case that predictive coding or predictive intra-coding in a temporal direction is carried out on a current block, it is unable to know inter-view motion information for the current block. So, it is able to predict an inter-view motion vector by the following methods according to another embodiment of the present invention.

In the first method, co-located blocks of pre-reference picture and post-reference picture of a current picture in a temporal or view direction are usable. For instance, inter-view motion vectors of 4×4 block are averaged to use.

In the second method, it is able to use an inter-view motion vector of a block indicated by a temporal-direction motion vector. This is to find an identical object and use a motion of the object. So, although a motion is large, even if depth of the object is not changed, it is able to predict an inter-view motion vector more accurately. In this case, since a position of a corresponding block, which is found using the temporal-direction motion vector, does not coincide with a 4×4 block unit exactly, motion information of nearest 4×4 block is used or motion information, to which a weight of a ratio of an area overlapped with the corresponding block is applied, is usable. Detailed embodiments for the methods are explained with reference to FIG. 4 as follows.

Figure 4:
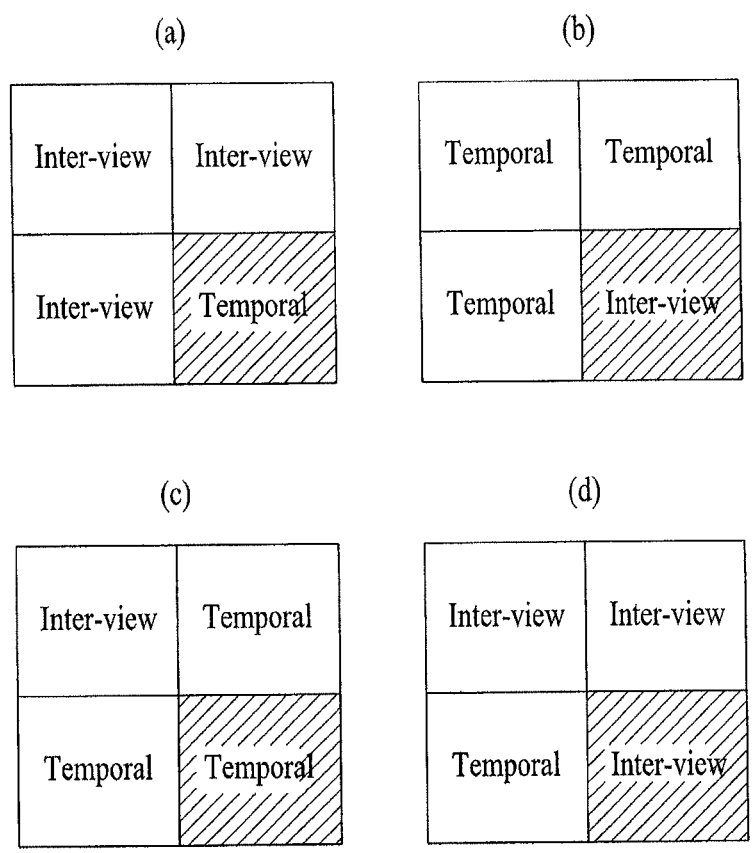
FIG. 4 is a diagram for a method of predicting a motion vector of a current block in correspondence to whether a reference picture of a neighbor block neighbor to the current block is in a view direction or a temporal direction according to one embodiment of the present invention.

FIG. 4 is a diagram for a method of predicting a motion vector of a current block in correspondence to whether a reference picture of a neighbor block neighbor to the current block is in a view direction or a temporal direction according to one embodiment of the present invention.

In case that every reference picture number of neighbor blocks differs from a reference picture number of a current block, 0 or other predicting method are available. For instance, FIG. 4(a) shows that every neighbor block refers to a view direction picture and a current block refers to a temporal direction picture. In this case, a predicted motion vector value of the current block can be set to 0. FIG. 4(b) shows that every neighbor block refers to a temporal direction picture and a current block refers to a view direction picture. In this case, for a predicted motion vector value of the current block, the motion vector predicting method explained in FIG. 2 or FIG. 3 is applicable. Alternatively, a predicted motion vector value of the current block can be set to 0.

There is another case that two of neighbor blocks refer to a picture in a same direction of a current block. For instance, FIG. 4(c) shows that when a current block refers to a temporal direction picture, two neighbor blocks refer to temporal direction pictures and the rest one refers to a view direction picture. In this case, motion vectors of the two neighbor blocks referring to the temporal direction pictures are averaged to be used as a predicted motion vector value of the current block. FIG. 4(d) shows that when a current block refers to a view direction picture, two neighbor blocks refer to view direction pictures and the rest one refers to a temporal direction picture. In this case, motion vectors of the two neighbor blocks referring to the view direction pictures are averaged to be used as a predicted motion vector value of the current block. The motion vector predicting method explained in FIG. 2 or FIG. 3 is applicable to the neighbor block referring to the temporal direction picture. A median value or a weighted average value is obtained from the correspondingly obtained motion vector and the motion vectors of the two neighbor blocks to be used as a predicted motion vector value of the current block.

Moreover, the predicting method explained in FIG. 2 or FIG. 3 is applicable to FIGS. 4(a) to 4(d) by a block unit.

Figure 5:
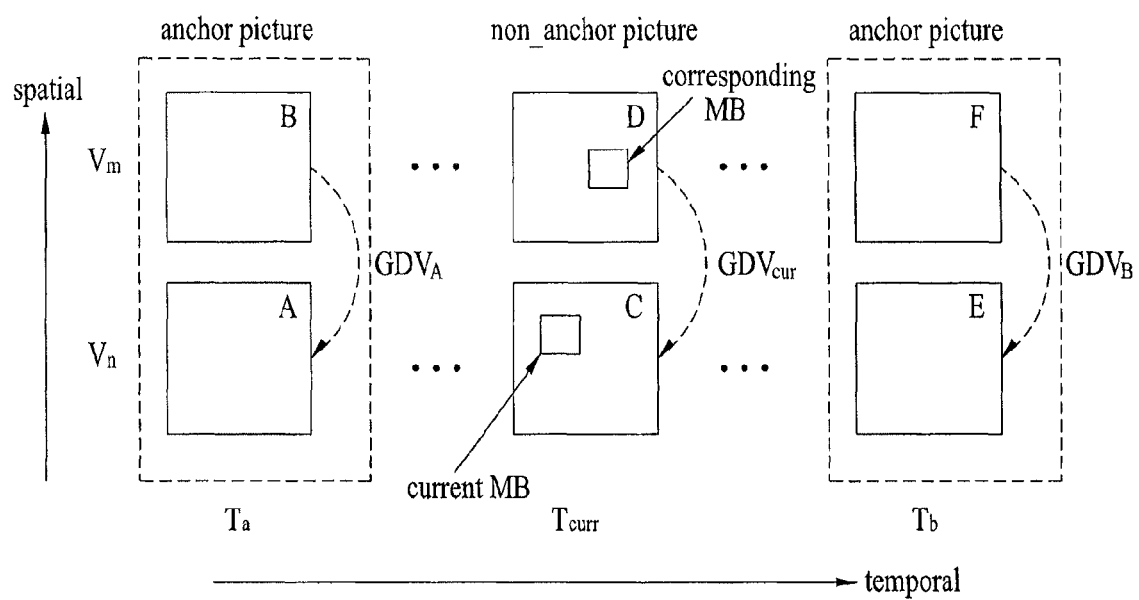
FIG. 5 is a diagram for a method of predicting coding information for a current block using inter-view correlation according to another embodiment of the present invention.

FIG. 5 is a diagram for a method of predicting coding information for a current block using inter-view correlation according to another embodiment of the present invention.

In a method of predicting a motion vector of a current block, by finding a corresponding block existing at a view different from that of the current block, it is able to predict coding information for the current block using coding information for the corresponding block. First of all, a method of finding the corresponding block existing at the view different from that of the current block is explained as follows.

For instance, a corresponding block may be a block indicated by a view direction motion vector of a current block. In this case, a view direction motion vector may means a vector representing inter-view disparity or a global motion vector. The meaning of the global motion vector is explained in the foregoing description of FIG. 3. And, the global motion vector may represent a corresponding macroblock position of neighboring view on the same temporal instant. Referring to FIG. 5, pictures A and B exist in time Ta, pictures C and D exist in time Tcurr, and pictures E and F exist in time Tb. In this case, the pictures A, B, E and F in the time Ta or Tb may be anchor pictures and the pictures C and D in the time Tcurr may be non-anchor pictures. The pictures A, C and E exist at a same view Vn and the pictures B, D and F exist at a same view Vm. The picture C is the picture to be decoded. And, a corresponding macroblock (MB) of the picture D is the block indicated by a view direction global motion vector GDVcurr of a current block (current MB). The global motion vector can be obtained by a macroblock unit between the current picture and a picture at a view neighbor to that of the current picture. In this case, information for the neighbor view can be known by the information indicating inter-view reference relation.

The information indicating inter-view reference relation (view dependency) means the information indicating what kind structure is used to predict interview sequences. This can be obtained from a data area of a video signal. For instance, the information can be obtained from a sequence parameter set area. And, the inter-view reference information can be obtained using the number of reference pictures and view information for the reference pictures. For instance, the number of total views is obtained. And, view information discriminating each vie can be then obtained based on the number of the total views. Moreover, the number of reference pictures can be obtained for a reference direction of each view. It is able to obtain view information for each of the reference pictures according to the number of the reference pictures. In this manner, the inter-view reference information can be obtained. And, the inter-view reference information can be obtained according to a case of anchor picture and a case of non-anchor picture. This can be observed using anchor picture identification information indicating whether a coded slice in a current NAL is an anchor picture or not.

A method of obtaining the global motion vector may vary according to the anchor picture identification information. For instance, in case that a current picture is an anchor picture, it is able to obtain the global motion vector from a received bit stream. If a current picture is a non-anchor picture, the global motion vector can be derived from that of the anchor picture.

In this case, information indicating a temporal distance is usable together with the global motion vector of the anchor picture. For instance, referring to FIG. 5, assuming that a global motion vector of a picture A is named GDVa and that a global motion vector of a picture E is named DGVb, a global motion vector of a current picture C (non-anchor picture) can be obtained using the global motion vectors of the pictures A and E (anchor pictures) and temporal distance information. For instance, the temporal distance information may include POC (picture order count) that indicates a picture output sequence. So, the global motion vector of the current picture can be derived using Formula 3.

$$GDV_{cur} = GDV_A + \left[\frac{T_{cur} - T_A}{T_B - T_A} \times (GDV_B - GDV_A)\right] \quad \text{[Formula 3]}$$

Thus, a block indicated by the derived global motion vector of the current picture can be regarded as a corresponding block to predict coding information for the current block.

All motion information and mode information for the corresponding block can be used to predict coding information for the current block. The coding information can include such various information necessary for coding the current block as motion information, information for illumination compensation, weighted prediction information and the like. In case that a motion skip mode is applied to a current macroblock, instead of coding motion information for the current block, motion information for a previously coded picture at a different view can be used intact as motion information for the current block. In this case, the motion skip mode includes a case of obtaining motion information for a current bock by depending on motion information for a corresponding block at a neighbor view. For instance, if a motion skip mode is applied to a current macroblock, all motion information for the corresponding block, e.g., macroblock type, reference index, motion vector, etc. can be used intact as motion information for the current macroblock. Yet, the motion skip mode may not be applicable to the following cases. For instance, a current picture is the picture at a reference view compatible with conventional codec or a current picture is an anchor picture. Besides, the motion skip mode is applicable to a case that a corresponding block exists at a neighbor view and is coded in an inter-prediction mode. In case that the motion skip mode is applied, motion information for a reference picture List0 is preferentially used according to the inter-view reference information. And, motion information for a reference picture List1 is usable if necessary.

Figure 6:
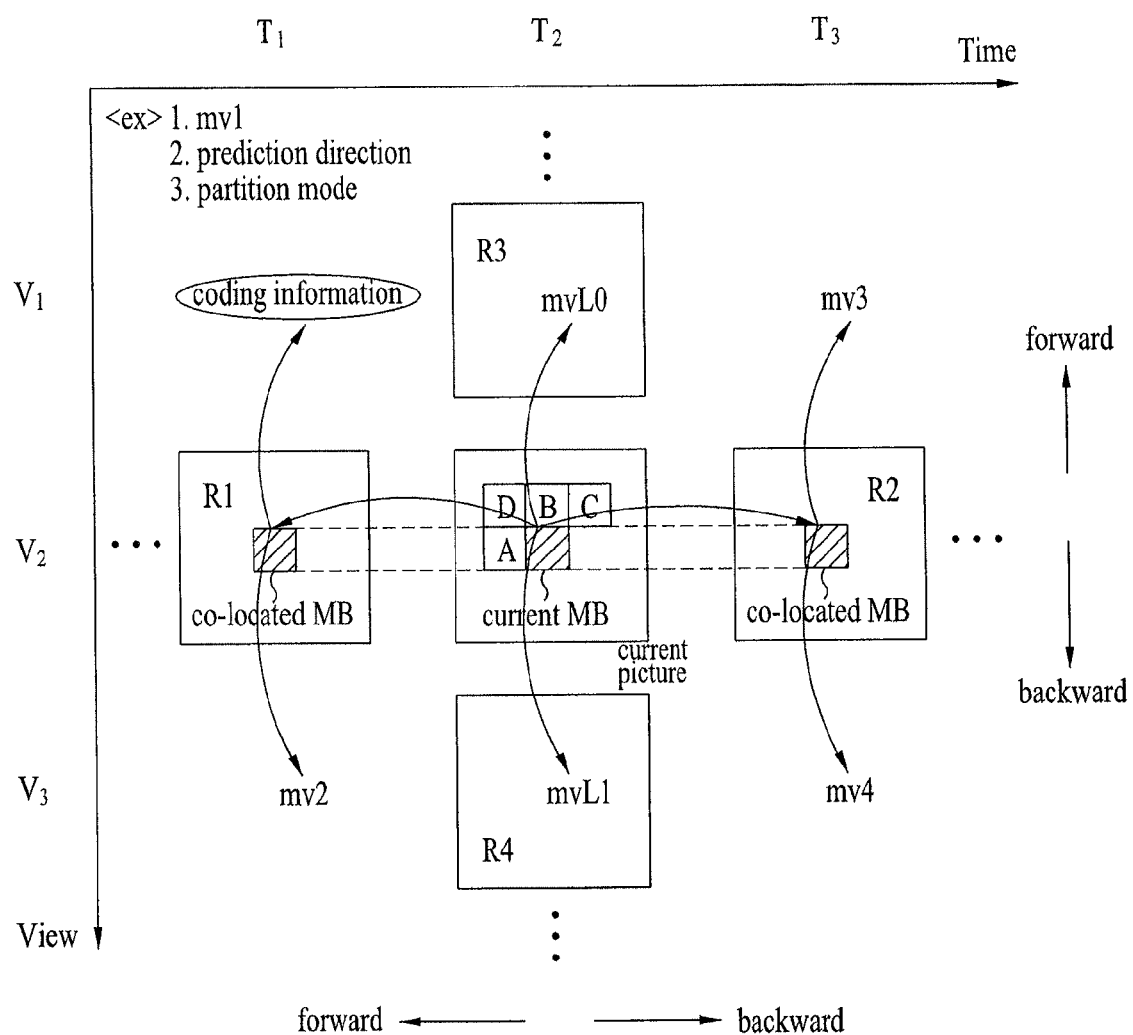
FIG. 6 is a diagram for a method of predicting coding information for a current block according to one embodiment of the present invention.

FIG. 6 is a diagram for a method of predicting coding information for a current block according to one embodiment of the present invention.

Coding information can be more accurately predicted using coding information correlation in a view direction. And, coding information for a current picture will have great correlation with coding informations obtained from pre-reference picture and post-reference picture in temporal direction. So, more accurate prediction is available using theses characteristics. Detailed embodiments thereof are explained with reference to FIG. 6 as follows.

In FIG. 6, a horizontal axis indicates a temporal axis ( . . . , $T_1$, $T_2$, $T_3$, . . . ). For convenience of explanation, a direction of a picture in a previous time is named a forward direction and a direction of a picture in a post time is named a backward direction, with reference to a current picture. Likewise, a vertical axis indicates a view axis ( . . . , $V_1$, $V_2$, $V_3$, . . . ). For convenience of explanation, a direction of a picture at a previous view $V_1$ is named a forward direction and a direction of a picture at a post view $V_3$ is named a backward direction, with reference to a current picture.

According to one embodiment of the present invention, it is able to predict view-direction motion informations using motion informations obtained from previous and post pictures of a current picture in a temporal direction. This method can use mode information as well. For instance, by defining a motion information prediction mode, it is able to inform whether the motion information prediction mode shall be applied. In predicting view-direction motion informations of a current block, it is able to use a co-located block located at a same position as the position of the current block among the pictures ahead of or behind the current picture in a temporal direction. After a temporal direction motion vector has been predicted from neighbor blocks to the current block, it is able to use a block indicated by the predicted motion vector.

For instance, in case that the motion information prediction mode is applied, it is able to intactly use motion information for a block located at a same position as the position of the current block (or at a position indicated by a temporal direction motion vector) in a pre-picture R1 or a post-picture R2 of the current picture in the temporal direction. For instance, predictive direction information, partition information, and a motion vector value can be used intact. In this case, flag information indicating that this mode will be applied and a block texture offset value can be coded. According to another embodiment, predictive direction information and partition information can be used intact. And, motion vector values mv1, mv2, mv3 and mv4 of the co-located block are usable as predicted motion vector values mvpL0 and mvpL1 of the current block. So, in case that the motion information prediction mode is applied, flag information indicating that the corresponding mode will be applied, a motion vector offset value, and a block texture offset value can be coded.

According to another embodiment, the predictive direction information and the partition information for the current block in the former embodiment may not use the predictive direction information and the partition information for the co-located block (or the block at the position indicated by the temporal direction motion vector) as they are. For instance, a motion vector value of the co-located block is used as a predicted motion vector value of the current block, while predictive direction information and partition information for the current block can be derived from blocks neighbor to the current block. In this case, both of the predictive direction information and the partition information can be coded.

According to a further embodiment, if a current picture is able to have a single reference picture in a view direction only, a method of predicting coding information for the current picture is explained. For instance, if forward prediction in a view direction is available for a current picture or if forward prediction in a view direction is available despite a plurality of reference pictures, a method of predicting coding information for a current picture is explained. In particular, with reference to a current picture, it is assumed that there are forward and backward reference pictures Ra and R2 in temporal direction. Coding information for a block at a correspondent position of the current block will be looked into. And, it will be looked into whether blocks at a correspondent position of the reference picture have a view-direction reference picture or a temporal-direction reference picture.

If all of the blocks at the correspondent position of the reference picture have the temporal-direction reference picture only, the current block may not use coding information for the blocks at the correspondent position of the reference picture. If one of the blocks at the correspondent position of the reference picture has a view-direction reference picture only, it is able to predict view-direction coding information for the current block using coding information for the corresponding block.

If both of the forward and backward reference pictures R1 and R2 in temporal direction refer to a picture in view direction, coding information for the current block can be predicted from one of the two reference pictures only. Using the coding information for one of the two reference pictures can be decided according to preset engagement. For instance, after partition information for the two reference pictures has been recognized, the partition information for the reference picture having a smaller partition can be used. In particular, the partition information for the current block can be predicted from the partition information for the reference picture of which partition has a size smaller than that of the other. Detailed embodiment is explained with reference to FIG. 7 as follows.

FIG. 7 is a table for various examples to select either a forward reference block or a backward reference block to predict partition information for a current block if both of the forward and backward reference blocks in a temporal direction refer to a block in a view direction according to one embodiment of the present invention.

If one of partition informations of a plurality of reference blocks is selected to predict partition information for a current block, it is able to use partition information for the reference block having a smaller partition among the partition informations of a plurality of the reference blocks. If the partition informations of the forward and backward reference blocks in temporal direction have the same partition information, it is able to predict the partition information for the current block as the same information. Yet, in case they have different information, a selection can be made.

For instance, if partition information for a forward reference block in temporal direction indicates a direct mode and if partition information for a backward reference block is 16×16, 16×8, 8×16 or 8×8, partition information for a current block can be predicted as 16×16, 16×8, 8×16 or 8×8. If partition information for a forward reference block in temporal direction indicates 16×8 and if partition information for a backward reference block indicates 8×8, it is able to use a subdivided partition 8×8 as a predicted partition information value of a current block. If partition information for a forward reference block in temporal direction indicates 8×16 and if partition information for a backward reference block indicates 16×8, it is able to use a subdivided partition 8×8 as a predicted partition information value of a current block.

The examples for the partition information in FIG. 7 may not be applicable to the case of not attempting to use coding information for a block at a correspondent position. In this case, view-direction coding information for a current block can be predicted using view-direction coding information for a corresponding block only. For instance, if partition information for a reference block and partition information for a current block are matched, a view-direction motion vector of a corresponding block can be used intact. In this case, if both forward and backward reference blocks exist, it is able to find a predicted motion vector value in a view direction by averaging view-direction motion vectors of corresponding partitions in both directions or applying a weight at a ratio of distance on a temporal axis. Alternatively, information in one direction can be used according to a given engagement.

If partition information for a reference block and partition information for a current block are not matched, motion vectors within blocks are averaged to use. For instance, when partition information for a current block is 16×16 block, if a reference block is predicted as 16×8, an average of motion vectors of the two 16×8 reference blocks can be used as a predicted motion vector value of the 16×16 current block. In case that reference blocks exist in both forward and backward directions, as mentioned in the foregoing description of the method, after a predicted motion vector value has been found by averaging motion vectors of partitions within the reference block in each of the directions, motion vectors in a corresponding view direction of both of the directions are averaged or a weight is applied by a ratio of a distance on a temporal axis to find a final predicted motion vector value. Alternatively, a vector in one direction is usable according to a given engagement.

Even if forward and backward reference pictures R1 and R2 in temporal direction refer to pictures in view direction, like the above example, either the reference picture R1 or the reference picture R2 is usable. For instance, coding information for a current block is predicted using either the forward reference picture R1 or the backward reference picture R2.

And, flag information can be used to indicate whether both of the two reference pictures R1 and R2, the forward reference picture or the backward reference picture is used.

According to another embodiment, when a current picture is able to have a plurality of reference pictures in view direction, a method of predicting coding information for the current picture is explained. For instance, when forward prediction, backward prediction and bi-directional prediction in view direction are available, a method of predicting coding information for a current picture is explained. In this case, as mentioned in the foregoing description of the former embodiments, the same manner is applicable.

According to another embodiment, if both forward and backward reference pictures R1 and R2 in temporal direction refer to pictures in view direction, coding information for a current block can be predicted from coding information for one of the two reference pictures only. Using the coding information for one of the two reference pictures can be decided according to preset information. For instance, in case of predicting predictive direction information of the coding information, predictive direction information for the two reference pictures is obtained and predictive direction information for the reference picture capable of including them is then usable. Detailed embodiment is explained with reference to FIG. 8.

FIG. 8 is a table for various examples to select either a forward reference block or a backward reference block to predict prediction direction information for a current block if both of the forward and backward reference blocks in a temporal direction refer to a block in a view direction according to one embodiment of the present invention.

In case that one of predictive direction informations of a plurality of reference blocks is selected to predict predictive direction information for a current block, predictive direction information for the reference picture capable of including all of them among the predictive direction informations of a plurality of the reference blocks can be used. If predictive direction informations for forward and backward reference blocks in temporal direction have the same predictive direction information, predictive direction information for a current block can be predicted as the same information. Yet, in case of having different information, a selection can be made. For instance, if predictive direction information for a forward reference block in temporal direction indicates a forward direction in view direction and if predictive direction information for a backward reference block in temporal direction indicates a backward direction in view direction, predictive direction information for a current block can be predicted bi-directionally. If predictive direction information for a forward reference block in temporal direction indicates bi-directions in view direction and if predictive direction information for a backward reference block in temporal direction indicates a forward or backward direction in view direction, bi-directions capable of including them can be predicted as predictive direction information for a current block.

Figure 9:
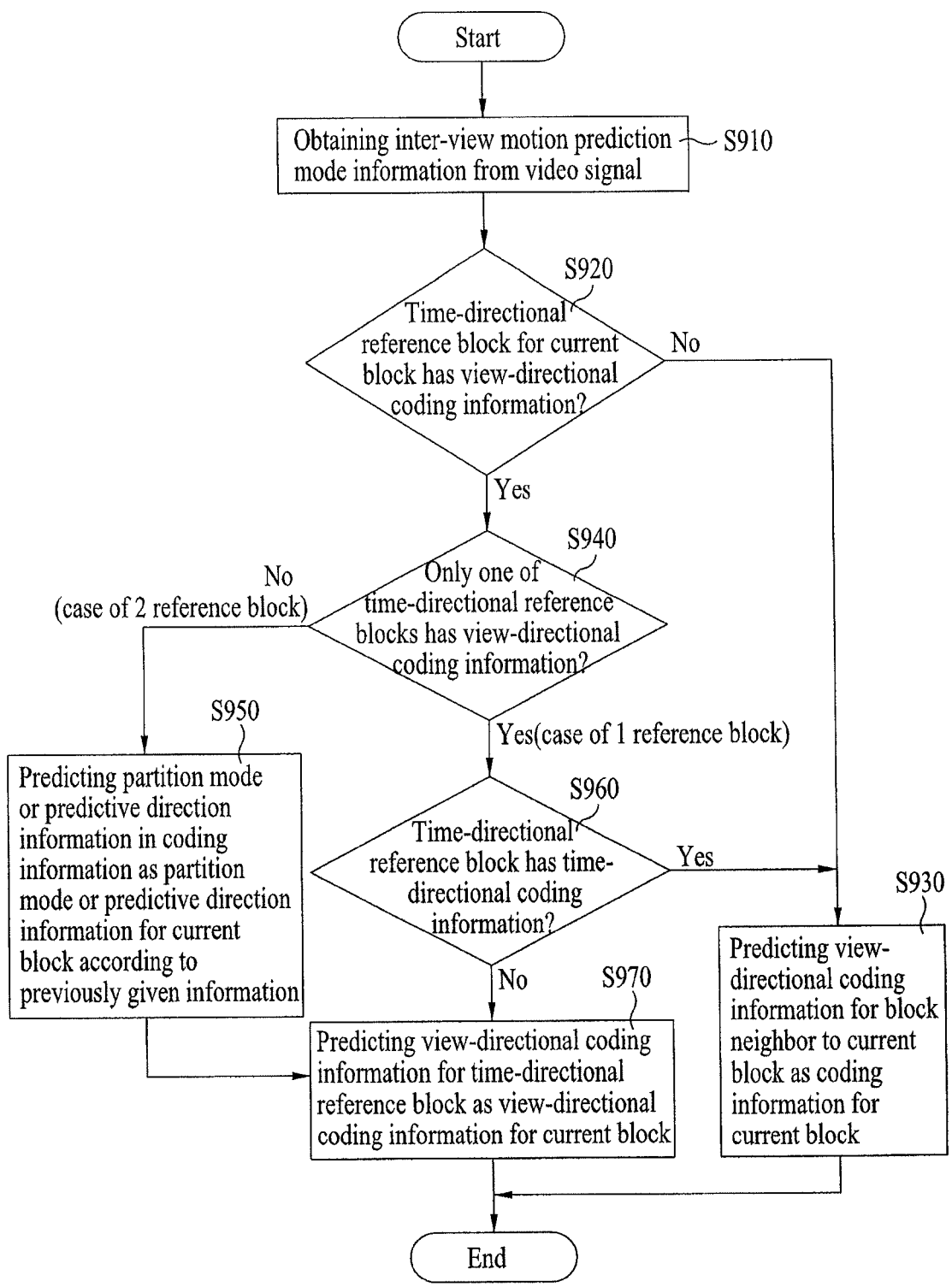
FIG. 9 is a flowchart of a method of predicting coding information for a view direction of a current block according to one embodiment of the present invention.

FIG. 9 is a flowchart of a method of predicting coding information for a view direction of a current block according to one embodiment of the present invention.

First of all, inter-view coding information prediction mode information can be obtained from a video signal (S910). If inter-view coding information prediction is applied by the prediction mode information, it is checked whether a reference block in temporal direction with reference to a current block has coding information for a view direction (S920). In this case, the reference block can be a co-located block located at a same position as the position of the current block. Alternatively, the reference block may be a block indicated by a motion vector derived from neighbor blocks to the current block. In this case, if the reference block does not have the coding information for the view direction, the current block can predict the coding information for the current block using coding information for the blocks neighbor to the current block (S930). Yet, if the reference block has the coding information for the view direction, various methods are applicable. For instance, it is checked how many reference blocks exist with the coding information for the view direction among the whole reference blocks (S940). In case that a plurality of the reference blocks have the coding information for the view direction among the whole reference blocks, it is able to predict coding information for the current block using the coding information for the reference blocks. For instance, it is able to use partition information or predictive direction information for the reference block as partition information or predictive direction information for the current block according to a preset engagement (S950). In case that one of the reference blocks has the coding information for the view direction, it is checked whether the reference block has coding information for a temporal direction (S960). As a result of the check, if the reference block does not have the coding information for the temporal direction, it is able to use the coding information for the view direction of the reference block as a predicted value of the coding information for the current block (S970). If this information is not usable, it is able to obtain a predicted coding information value of the current block using coding information for blocks neighbor to the current block (S930).

Figure 10:
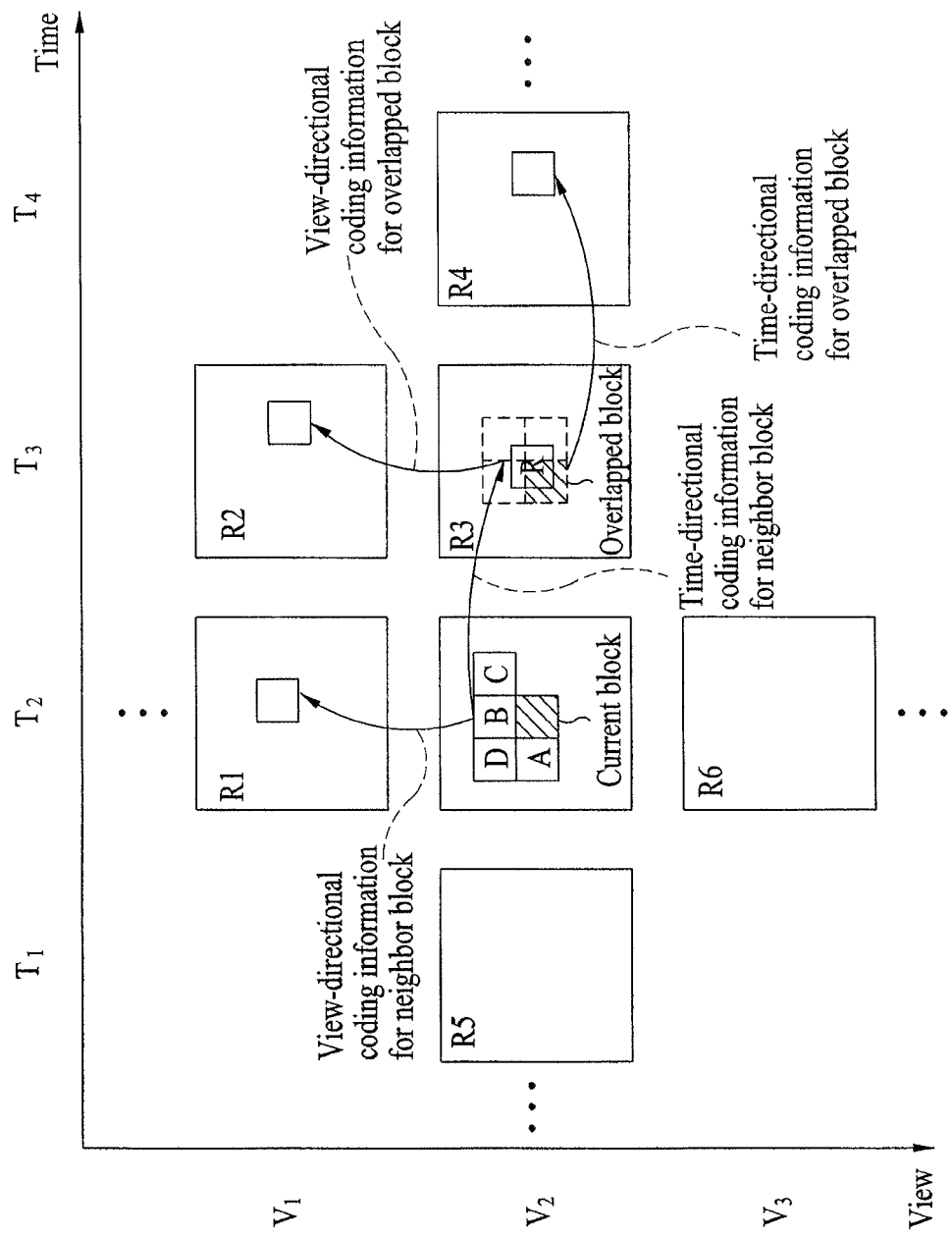
FIG. 10 is a flowchart of a method of predicting coding information for a current block according to one embodiment of the present invention.

FIG. 10 is a flowchart of a method of predicting coding information for a current block according to one embodiment of the present invention.

In multi-view video coding, it is able to use coding information for a block neighbor to a current block to predict coding information for the current block. For instance, the coding information can include motion information, predictive direction information, partition information, illumination compensation information and the like. Yet, the neighbor blocks can refer to a picture at a same view on a different time zone or a picture at a different view on a same time zone. And, the neighbor blocks can refer to a picture at a different view on a different time zone as well. So, a method of using coding information for a neighbor block selectively according to whether a picture referred to by a current block is in a view direction or a temporal direction may be more effective. Since correlation between coding information in view direction and coding information in temporal direction is low, it is able to differently design a coding information predicting method in case of performing inter-view prediction. Detailed embodiments are explained with reference to FIG. 10.

In FIG. 10, a horizontal axis indicates a temporal axis ( . . . , $T_1$, $T_2$, $T_3$, . . . ). For convenience of explanation, a direction of a picture in a previous time $T_1$ is named a forward direction and a direction of a picture in a post time $T_3$ is named a backward direction, with reference to a current picture ($T_2$). Likewise, a vertical axis indicates a view axis ( . . . , $V_1$, $V_2$, $V_3$, . . . ). For convenience of explanation, a direction of a picture at a previous view $V_1$ is named a forward direction and a direction of a picture at a post view $V_3$ is named a backward direction, with reference to a current picture.

According to one embodiment of the present invention, coding information for blocks A, B, C and D neighbor to a current block is usable to predict coding information for a view direction of the current block. For instance, in case that the neighbor block refers to a picture in a view direction, it is able to use coding information for the neighbor block as a predicted coding information value of the current block. In case that the neighbor block refers to a picture in a temporal direction, it is able to set the coding information for the neighbor block to 0. In case that predictive intra-coding is carried out on the neighbor block, the coding information for the neighbor block is not used or set to 0.

According to another embodiment of the present invention, in case that a block B neighbor to a current block refers to a picture R3 in a temporal direction, it is able to predict coding information in a view direction of the current block using coding information for the reference picture R3 in the temporal direction. For instance, a block at a position indicated by a motion vector of a block B neighbor to a current block is firstly found. In this case, like the reference picture R3 shown in FIG. 10, the block at the position indicated by the motion vector of the neighbor block B may not accurately coincide with one of the blocks within a normalized lattice structure of the reference picture R3.

Namely, it may be overlapped with a plurality of blocks. In this case, various embodiments are applicable to predict coding information for a view direction of the current block.

According to one embodiment, it can be checked whether there exists a block that refers to a picture in a view direction among blocks overlapped with the block at the position indicated by the motion vector of the neighbor block B. For instance, if there does not exist a single block that refers to a picture in a view direction among blocks overlapped with the block at the position indicated by the motion vector of the neighbor block B (e.g., a case of a block predicted in a temporal direction, a case of an intra-predicted block), the overlapped blocks may not be used. As the overlapped blocks are entirely removed, if it is unable to predict a motion vector in a view direction of the current block, the neighbor block B is not used to predict the motion vector of the current block or set to 0.

Yet, if there exists at least one block that refers to a picture in a view direction among the overlapped blocks, it is able to use coding information for a block having a largest overlapped area. For instance, it is able to use a motion vector value for a view direction of the block having the largest overlapped area as a predicted motion vector value for a view direction of the current block. Alternatively, if at least tow areas are most widely overlapped with the same area, it is able to find an average or median of the largest overlapped blocks. Alternatively, it is able to find a value generated from applying a weight to each overlapped area. Alternatively, a method of simply averaging the respective overlapped areas is usable. If bi-directional prediction coding is carried out on a block used for the overlapped area, the above-explained method is applicable in using coding information in each view direction.

Since multi-view video coded pictures enable bi-directional prediction in temporal direction, the following detailed algorithm is applicable to each case.

First of all, in referring to a picture in a temporal direction, if a predictive direction is either a forward direction or a backward direction, the above-explained method can be intactly applied. Yet, in case of bi-direction prediction in a temporal direction, it is able to confirm whether a block found using a motion vector in a temporal direction refers to a picture in a view direction. In case that one of tow directions refers to a picture in a view direction only, it is able to use coding information for a block that refers to a picture in the view direction only. Yet, if the bi-directional reference blocks refer to the picture in the view direction, it is able to use coding information for the bi-directional reference blocks. In this case, in using the coding information for the bi-directional reference blocks, the above explanation is applicable intactly. For instance, it is able to use coding information for a block that refers to a picture in a view direction among blocks overlapped with a block at a position indicated by a motion vector of a block neighbor to a current block. And, details using methods can be applied in the same manner of the above explanation.

Various embodiments can be provided as the case that the bi-directional reference blocks refer to the picture in the view direction. For instance, the reference blocks may correspond to forward prediction, forward prediction or bi-directional prediction in view direction. Likewise, the above explanation is intactly applicable to each case.

In case that coding informations for the bi-directional reference blocks are obtained, the coding informations are averaged to be used as view-direction coding information for a block neighbor to the current block. In this case, if a temporally forward reference block differs from a temporally backward reference block in a temporal distance, a weight is applicable.

After coding information in a view direction has been predicted for each block neighbor to a current block by the above-explained method, coding information for the current block can be predicted. Alternatively, in the process for predicting coding information for a current block by a related art method, it is able to predict coding information in a view direction by the above-explained method.

Figure 11:
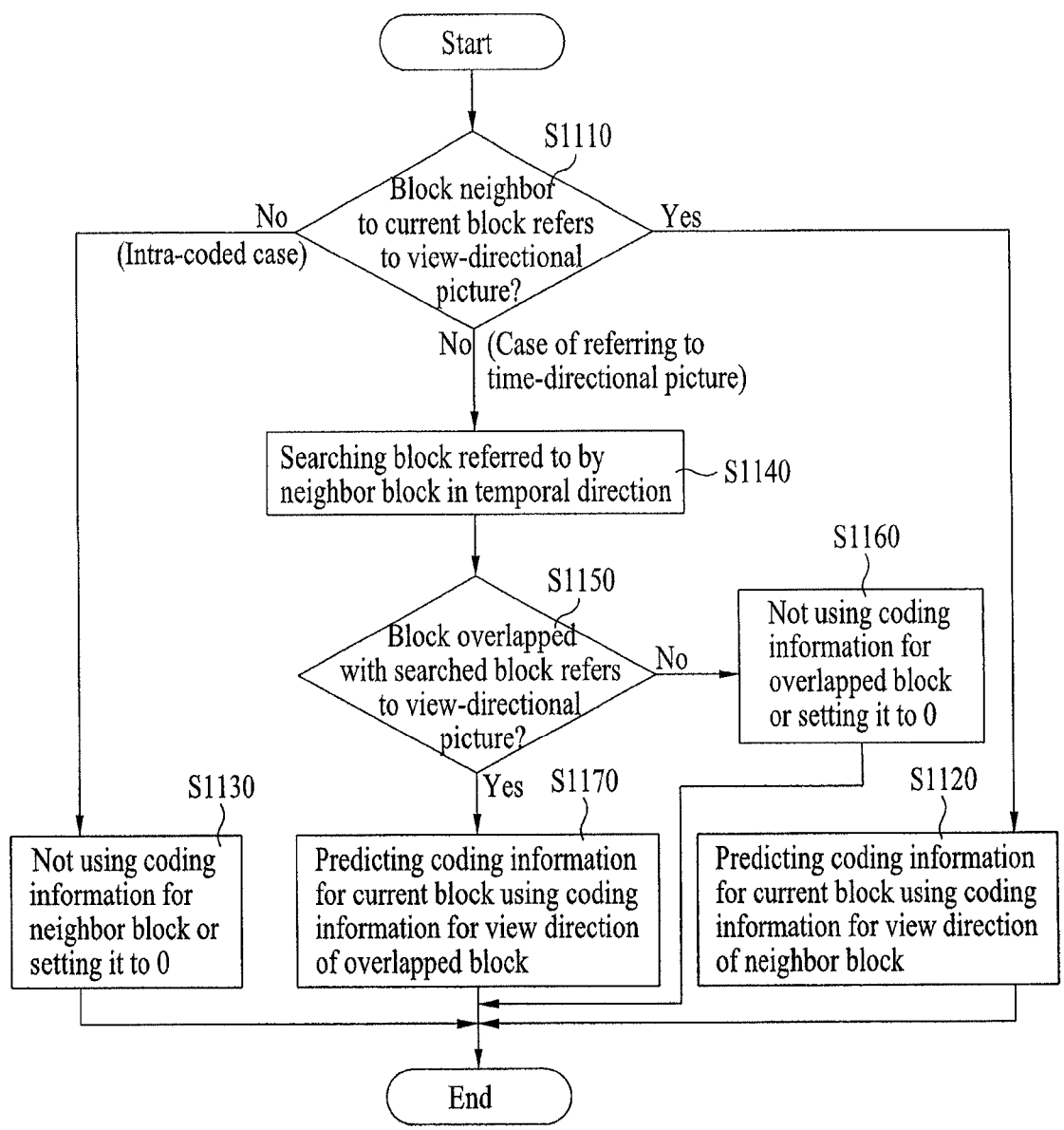
FIG. 11 is a flowchart of a method of predicting coding information for a view direction of a current block according to another embodiment of the present invention.

FIG. 11 is a flowchart of a method of predicting coding information for a view direction of a current block according to another embodiment of the present invention.

First of all, it is able to check whether a block neighbor to a current block refers to a picture in a view direction (S1110). In this case, it is able to check the neighbor blocks in a predetermined order. For instance, a block (A) left to the current block is firstly checked, a block (B) above the current block is checked, a block (c) right to the upper block (B) is checked, and a block (D) left to the upper block (B) is then checked. Alternatively, after the upper block (B) has been firstly checked, the left block (A) of the current block, the right block (C) of the upper block (B), and the left block (D) of the upper block (B) can be checked in sequence. If the neighbor block refers to a picture in a view direction according to the checking process, it is able to predict coding information for the current block using coding information for the view direction of the neighbor block (S1120). Yet, if the neighbor block does not refer to the picture in the view direction, e.g., if the neighbor block is intra-coded, the coding information for the neighbor block is not used or set to 0 (S1130).

According to another example of the case that the neighbor block does not refer to a picture in a view direction, if the neighbor block refers to a picture in a temporal direction, it is able to search a reference block in the temporal direction (S1140). And, it is able to check a part where the searched reference block is overlapped with blocks of the reference picture in the temporal direction. In this case, it is able to check whether there exists a block that refers to a picture in a view direction among the overlapped blocks (S1150). If the overlapped block does not refer to the picture in the view direction, coding information for the overlapped block is not used or set to 0 (S1160). Yet, if the overlapped block refers to the picture in the view direction, it is able to predict coding information for the current block using the coding information for the view direction of the overlapped block (S1170). In this case, if there exists at least one block that refers to the picture in the view direction among the overlapped blocks, it is able to use coding information for a block having a largest overlapped area. For instance, it is able to use a motion vector value for a view direction of the block having the largest overlapped area as a predicted motion vector value for the view direction of the current block. If at least two areas are most widely overlapped with the same area, it is able to find an average or median of the most widely overlapped blocks. Alternatively, a method of applying a weight to each overlapped area is applicable. If bi-directional prediction coding in view direction is carried out on a block used in the overlapped area, the method explained in FIG. 10 is applicable to using coding information in each view direction.

As mentioned in the foregoing description, a signal processing apparatus according to the present invention is provided to a multimedia broadcast transmitting/receiving device for DMB (digital multimedia broadcasting) and the like and then used to decode a video signal, a data signal and the like. And, the multimedia broadcast transmitting/receiving device can include a mobile communication terminal.

A signal processing method according to the present invention can be stored in a computer-readable recording medium by being prepared as a program for execution in computer. And, multimedia data having a data structure according to the present invention can be stored in a computer-readable recording medium. Moreover, the computer-readable recording media include all kinds of storage devices for storing data readable by a computer system. The computer-readable recording media include ROM, RAM, CD-ROM, magnetic tape, floppy disc, optical data storage device, and the like and also include a thing implemented with a carrier wave form (e.g., transport via Internet). And, a bit stream generated by the encoding method is stored in a computer-readable recording medium or transported via wire/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the technique for compression encoding of video signal data considers spatial duplication, temporal duplication, scalable duplication, and inter-view duplication. In the compression encoding process, it is able to perform compression coding by considering mutual duplication existing between views. The technique for the compression coding considering inter-view duplication is just one embodiment of the present invention. And, the technological idea of the present invention is applicable to temporal duplication, scalable duplication, etc.

What is claimed is:

1. A method of decoding a multi-view video signal with a video decoding apparatus, comprising:
    extracting, with the video decoding apparatus, anchor picture identification information from the multi-view video signal, the anchor picture identification information indicating whether a current picture is an anchor picture, the anchor picture referring only picture corresponding to a same time and a different view of the anchor picture;
    deriving, with the video decoding apparatus, a global motion vector of the current picture using at least one of global motion vector of the anchor picture and temporal distance information when the anchor picture identification information indicates that the current picture is a non-anchor picture, the global motion vector indicating a motion vector corresponding to a picture;
    deriving, with the video decoding apparatus, the global motion vector of the current picture from the multi-view video signal when the anchor picture identification information indicates that the current picture is the anchor picture;
    extracting, with the video decoding apparatus, a motion skip flag from the multi-view video signal, the motion skip flag indicating whether motion information of a current block is derived;
    determining, with the video decoding apparatus, a corresponding block in a neighboring view based on the global motion vector of a current picture in a current view when the motion skip flag indicates that the motion information of the current block is derived, the neighboring view being a view other than the current view; obtaining, with the video decoding apparatus, motion information of the determined corresponding block;
    generating, with the video decoding apparatus, motion information of a current block in the current picture using the motion information of the determined corresponding block;
    determining, with the video decoding apparatus, a reference block in the current view based on the motion information of the current block; and predicting, with the video decoding apparatus, a pixel value of the current block using the reference block, wherein the reference block exists on other pictures in the current view except the current picture, wherein corresponding block in the neighboring view is at a same temporal location as the current block in the current view, and wherein the motion information comprises a motion vector, block type information, and a reference index.

2. The method of claim 1, wherein the global motion vector of the current picture is derived by the following equation:

$$GDV_{cur}=GDV_A+[T_{cur}-T_A/T_B-T_A\times(GDV_b-GDV_a)]$$

wherein GDVcur is the global motion vector of current picture, GDVa is the global motion vector of first anchor picture, GDVb is the global motion vector of second anchor picture, Ta is the temporal distance information of the first anchor picture, Tb is the temporal distance information of the second anchor picture and $T_{cur}$ is the temporal distance information of the current picture.

3. The method of claim 2, wherein the temporal distance information is Picture Order Count.

* * * * *